United States Patent
Wood

(10) Patent No.: US 7,255,387 B2
(45) Date of Patent: Aug. 14, 2007

(54) VORTEX STRAKE DEVICE AND METHOD FOR REDUCING THE AERODYNAMIC DRAG OF GROUND VEHICLES

(75) Inventor: Richard M. Wood, Virginia Beach, VA (US)

(73) Assignee: Solus Solutions and Technologies, LLC, Hampton, VA (US)

( * ) Notice: Subject to any disclaimer, the term of this patent is extended or adjusted under 35 U.S.C. 154(b) by 0 days.

(21) Appl. No.: 10/914,675

(22) Filed: Aug. 10, 2004

(65) Prior Publication Data

US 2005/0040669 A1 Feb. 24, 2005

Related U.S. Application Data

(60) Provisional application No. 60/496,851, filed on Aug. 21, 2003.

(51) Int. Cl.
*B60J 9/04* (2006.01)
(52) U.S. Cl. .................................. 296/180.1
(58) Field of Classification Search ......... 296/180.1–5; 244/200.1, 199.1, 204.1, 198, 201; 114/67 R
See application file for complete search history.

(56) References Cited

U.S. PATENT DOCUMENTS

| | | | |
|---|---|---|---|
| 2,569,983 A | 10/1951 | Favre | |
| 2,737,411 A | 3/1956 | Potter | |
| 3,010,754 A | 11/1961 | Shumaker | |
| 3,999,797 A | 12/1976 | Kirsch | |
| 4,006,932 A | 2/1977 | McDonald | |
| 4,214,787 A | 7/1980 | Chain | |
| 4,257,641 A | 3/1981 | Keedy | |
| 4,284,302 A * | 8/1981 | Drews | 296/181.5 |
| 4,343,506 A * | 8/1982 | Saltzman | 296/24.31 |
| 4,451,074 A | 5/1984 | Scanlon | |
| 4,455,045 A * | 6/1984 | Wheeler | 296/181.5 |
| 4,458,936 A | 7/1984 | Mulholland | |
| 4,508,380 A | 4/1985 | Sankrithi | |
| 4,601,508 A | 7/1986 | Kerian | |
| 4,682,808 A | 7/1987 | Bilanin | |
| 4,706,910 A * | 11/1987 | Walsh et al. | 244/130 |
| 4,741,569 A | 5/1988 | Sutphen | |
| 4,789,117 A * | 12/1988 | Paterson et al. | 244/130 |
| 4,813,635 A * | 3/1989 | Paterson et al. | 244/130 |
| 4,830,315 A * | 5/1989 | Presz et al. | 244/200 |
| 4,978,162 A | 12/1990 | Labbe | |
| 5,058,837 A * | 10/1991 | Wheeler | 244/200.1 |
| 5,058,945 A * | 10/1991 | Elliott et al. | 296/180.5 |

(Continued)

*Primary Examiner*—H Gutman
(74) *Attorney, Agent, or Firm*—Williams Mullen; M. Bruce Harper; Matthew R. Osenga

(57) ABSTRACT

An improved method and device for the reduction of aerodynamic drag and for increased fuel economy of ground vehicles by increasing the pressure on the rear surface of the vehicle with a plurality of vortices generated along the top and side surfaces of the ground vehicle that flow in to the base wake region of the vehicle. The invention is comprised of a minimum number of small surfaces that attach to the side and top exterior surfaces of a ground vehicle. The spacing and orientation of the small surfaces, comprising the device, are dependent upon the vehicle geometry and vehicle operating conditions. The plurality of small surfaces are located forward of the vehicle base area. The plurality of adjacent small surfaces and are distributed circumferentially over the side and top surfaces of the ground vehicle.

28 Claims, 14 Drawing Sheets

U.S. PATENT DOCUMENTS

| | | |
|---|---|---|
| 5,280,990 A | 1/1994 | Rinard |
| 5,348,366 A | 9/1994 | Baker |
| 5,374,013 A * | 12/1994 | Bassett et al. ............... 244/130 |
| 5,887,280 A * | 3/1999 | Waring ............................. 2/69 |
| 5,908,217 A | 6/1999 | Englar |
| 6,092,861 A | 7/2000 | Whelan |
| 6,276,636 B1 * | 8/2001 | Krastel ....................... 244/130 |
| 6,286,892 B1 | 9/2001 | Bauer |
| 6,412,853 B1 * | 7/2002 | Richardson ............... 296/180.1 |
| 6,502,383 B1 * | 1/2003 | Janardan et al. ........... 60/226.1 |
| 6,702,364 B2 * | 3/2004 | Neel ........................ 296/180.2 |
| 6,789,492 B2 * | 9/2004 | Latorre ...................... 114/67 A |
| 6,899,369 B2 * | 5/2005 | Neel ........................... 296/91 |
| 6,959,958 B2 * | 11/2005 | Basford ................... 296/180.1 |
| 2005/0012358 A1 * | 1/2005 | Choi et al. ................ 296/180.1 |

* cited by examiner

Z - Z

Z-Z

Z-Z

VORTEX STRAKE DEVICE AND METHOD FOR REDUCING THE AERODYNAMIC DRAG OF GROUND VEHICLES

CROSS-REFERENCE TO RELATED APPLICATIONS

This application claims a previous provisional patent application, No. 60/496,851 with a filing date of Aug. 21, 2003 and entitled "Vortex strake device and method for reducing the aerodynamic drag of ground vehicles".

ORIGIN OF THE INVENTION

The invention described herein was made by employees of the United States Government, and may be manufactured and used by or for the Government without payment of any royalties thereon or therefore.

REFERENCE TO SEQUENCE LISTING, A TABLE, OR A COMPUTER PROGRAM LISTING COMPACT DISK APPENDIX

Not applicable.

BACKGROUND—Field of Invention

The invention relates to the reduction of aerodynamic drag for moving ground vehicles; specifically to an improved method and device for the reduction of aerodynamic drag and for improved performance of ground vehicles by increasing the pressure on the base area of a vehicle or vehicle component by controlling the flow in wake of the vehicle or vehicle component.

BACKGROUND—DESCRIPTION OF PRIOR ART

In the prior art there have been attempts to reduce the aerodynamic drag associated with the bluff base of the trailer of a tractor-trailer truck system. The wake flow emanating from the bluff base trailer is characterized as unsteady and dynamic. The unsteady nature of the wake flow is a result of asymmetric and oscillatory vortex shedding of the side surface and top surface flow at the trailing edge of the top and side surfaces of the vehicle. The boundary-layer flow passing along the top and side surfaces of the vehicle is at a low energy state and is unable to expand around the corner defined by the intersection of the side or top surfaces with the base surface. The boundary-layer flow separates at the trailing edge of the top and side surfaces and forms rotational-flow structures that comprise the bluff-base wake flow. The low energy flow separating at the trailing edges of the side surfaces and top surface of the trailer is unable to energize and stabilize the low energy bluff-base wake flow. The resulting bluff-base wake-flow structure emanating from the base area of the vehicle is comprised of the vortex structures that are shed from trailing edges of the side surfaces and top surface of the vehicle. Contributing to the low-energy bluff-base wake is the low-energy turbulent flow that exits from the vehicle undercarriage at the base of the vehicle. The unsteady wake flow imparts a low pressure onto the aft facing surface of the trailer base that results in significant aerodynamic drag. Prior art has addressed these flow phenomena by adding to the bluff base; a pre-defined aerodynamic surface referred to as a boat-tail fairings, surfaces and plates that create a cavity, and surfaces and plates that trap the vortices shed from the trailing edges. Prior art also show the forcing the side surface and top surface flow into the base region through the use of turning vanes or jets of air.

Prior art has used the aerodynamic boat-tail fairings applied to the trailer base in order to eliminate flow separation and associated drag, see U.S. Pat. Nos. 4,458,936, 4,601,508, 4,006,932, 4,451,074, 6,092,861, 4,741,569, 4,257,641, 4,508,380, 4,978,162 and 2,737,411. These representative aerodynamic boat-tail fairing devices, while successful in eliminating flow separation, are complex devices that are typically comprised of moving parts that require maintenance and add weight to the vehicle. These devices take a variety of form and may be active, passive, rigid, flexible and/or inflatable. These attributes have a negative impact on operational performance and interfere with normal operations of the vehicle.

Other concepts as documented in U.S. Pat. Nos. 5,348,366, 4,682,808 and 4,214,787 consist of plates or surfaces that are attached to the base of a trailer or extend from support mechanisms that are attached to the base of a trailer. These devices operate by trapping the separated flow in a preferred position in order to create an effective aerodynamic boat-tail shape. These representative trailer base devices, while successful in reducing the drag due to base flow are complex devices that are typically comprised of moving parts that require maintenance and add weight to the vehicle. All of these devices add significant weight to the vehicle. These attributes have a negative impact on operational performance and interfere with normal operations of the vehicle.

U.S. Pat. Nos. 3,010,754, 5,280,990, 2,569,983 and 3,999,797 apply a flow turning vane to the outer perimeter of the trailer base on the sides and top to direct the flow passing over the sides and top of the trailer into the wake in order to minimize the drag penalty of the trailer base flow. These devices provide a drag reduction benefit but they require maintenance and interfere with normal operations of the trailers fitted with swinging doors. These devices also add weight to the vehicle that would have a negative impact on operational performance of the vehicle.

Several concepts employ pneumatic concepts to reduce the aerodynamic drag of tractor-trailer truck systems. U.S. Pat. No. 5,908,217 adds a plurality of nozzles to the outer perimeter of the trailer base to control the flow turning from the sides and top of trailer and into the base region. U.S. Pat. No. 6,286,892 adds a porous surface to the trailer base and to the sides and top regions of the trailer abutting the trailer base. These porous surfaces cover a minimum depth plenum that is shared by the sides, top and base regions of the trailer. These two patents provide a drag reduction benefit but as with the other devices discussed previously these devices are complex devices, comprised of moving parts, interfere with normal operations of the truck and add weight to the vehicle. These characteristics of the devices result in a negative impact on the vehicle operational performance.

SUMMARY OF THE INVENTION

The invention relates to an aerodynamic or hydrodynamic drag reduction device for use on a vehicle which includes a plurality of small surfaces attached to the aft exterior surface of the vehicle and means for attaching the small surfaces to the vehicle. The plurality of small surfaces is symmetrically positioned about the vehicle's principle longitudinal axis and the plurality of small surfaces is approximately equally spaced around the majority of the circumference of said vehicle. Each of the small surfaces are positioned at approximately the same longitudinal position on the vehicle with each of the small surfaces extending outward from the exterior surface of the vehicle a distance equal to the local boundary layer thickness on the vehicle in the region of the small surfaces. Each of the small surfaces extends an equivalent distance perpendicularly outward from the exterior surface of the vehicle, the small surfaces that are adjacent to one another on either the right or left side of the vehicle being substantially parallel to one another. Each of the small surfaces may have a forward most edge that is pointed. The small surfaces are thin with a maximum thickness of 1.0 inches and a minimum length that is equal to 5 times the local boundary layer thickness on the vehicle in the region of the small surfaces. Each of the small surfaces is inclined a minimum of 10° to the local flow direction measured on the vehicle surface in the region of the small surfaces. Each of the small surfaces are separated from and substantially parallel to one another allow them to generate a vortex of equivalent strength whereby the flow passing along the external surface of the vehicle in the region of and aft of the small surfaces is energized. In this way, the external trailing wake flow of the vehicle is changed to a substantially steady symmetric wake flow field.

The invention also relates to a method for reducing the aerodynamic or hydrodynamic drag of an object moving through a gas or liquid. The method includes modifying the exterior surface of the object to produce a plurality of small surfaces distributed on the surface of the object. The surfaces are symmetrically produced about the object's principle longitudinal axis and the small surfaces are located circumferentially in an approximately equally spaced row. Each of the small surfaces that are adjacent to one another on either the right or left side of the object is substantially parallel to one another and are oriented at an incline of 10° to 30° with respect to the local surface flow direction. The surfaces extend outward from the exterior surface of the object a distance equal to the distance of the local boundary layer thickness on the object. The surfaces may have a cross-section of arbitrary shape. The small surfaces are thin with a maximum thickness of 1.0 inches and a minimum length that is equal to 5 times the local boundary layer thickness on the vehicle in the region of the small surfaces. Each of the small surfaces are separated from and substantially parallel to one another allow them to generate a vortex of equivalent strength whereby the flow passing along the external surface of the vehicle in the region of and aft of the small surfaces is energized. In this way, the external trailing wake flow of the vehicle is changed to a substantially steady symmetric wake flow field and drag is reduced.

An object of the invention is to use a limited number of large vortex structures generated on the side and top exterior surfaces of a trailer to energize the flow exiting the trailing edge of the side and top exterior surfaces of the trailer and thereby increasing the ability of the flow on the trailer side and trailer top exterior surfaces to expand into the base region and provide drag reduction, increased fuel economy and improved operational performance. Additionally the vortex structures generated by the subject invention have a preferred angular velocity direction that enhances the mixing of the trailer undercarriage flow with the bluff-base wake flow. Aerodynamic drag reduction is created by increasing the pressure loading on the bluff-base aft-facing surface of the vehicle or vehicle component such as the trailer of a tractor-trailer truck. The invention relates to flow in the base region behind a bluff-base vehicle or vehicle component. The flow in the base region behind a bluff-base vehicle or vehicle component is a function of vehicle geometry, vehicle speed and the free stream flow direction.

The device provides improved performance for both the no crosswind condition, in which the air is still, as well as the condition when crosswind flow is present. For all moving vehicles that operate on the ground a crosswind flow is always present due to a combination of atmospheric and environmental factors and the interaction of the naturally occurring wind with stationary geological and manmade structures adjacent to the vehicle path as well as interfering flows from adjacent moving vehicles. The device is designed to reduce aerodynamic drag for the all cross wind conditions for single and multiple-component bluff-base vehicles. The subject device uses vortex flows to energize the flow on passing along the exterior top and sides surfaces of a bluff-base ground vehicle to increase the energy of the wake flow and the mixing of the wake flow with the undercarriage flow. The subject device provides reduced aerodynamic drag for all of bluff-base ground vehicles.

The present invention is a simple device comprised of a minimum number of thin, slender and rigid surfaces that attached to the side and top exterior surfaces of a ground vehicle or vehicle component. The spacing and orientation of the surfaces, comprising the device, are dependent upon the vehicle geometry and vehicle operating conditions.

The present invention pioneers a novel device that is comprised of a plurality of adjacent surfaces that are attached to the top and side exterior surfaces of a bluff-base vehicle or vehicle component. The plurality of adjacent surfaces are located forward of the base area on the vehicle. The plurality of adjacent surfaces are distributed circumferentially over the side and top surfaces of the subject vehicle or vehicle component. To maximize the ability of each of the plurality of adjacent surfaces to generate a vortex structure the surfaces are aligned in planes or surfaces that are perpendicular to the surface of the vehicle. Each of the plurality of adjacent surfaces extends from the exterior top and side surfaces of the bluff-base vehicle. The plurality of adjacent surfaces is applied symmetrically to vehicle, about a vertical plane passing through the centerline of the vehicle. Each of the plurality of adjacent surfaces is orientated in a plane or surface that is at an angle to the local flow direction on the vehicle surface in the immediate vicinity of the present invention. The orientation and shape of the plurality of adjacent surfaces are a function of the vehicle or vehicle component geometry.

For ground vehicles such as tractor-trailer trucks, which have a cross-section shape that is predominately rectangular or square, the plurality of adjacent surfaces will be planar. The flow passing over this class of vehicle is parallel to the vehicle centerline and moving aft along the vehicle surface. The number, shape, width and orientation of the plurality of adjacent surfaces that comprise the invention are determined by; the vehicle geometry and vehicle average operating speed. The preferred embodiment of the invention is to have each of the surfaces, comprising the invention, located on the sides of the vehicle orientated with the leading edge positioned above the trailing edge. The surfaces located on the side of the vehicle will be evenly distributed from the lowest edge of the side surface to the highest edge of the side surface. The trailing edge of the surface located nearest the lowest edge of the side surface will be approximately coincident with the lowest edge of the side surface. The vertical position of adjacent surfaces, increasing vertical position, on the side of the vehicle will be such that the trailing edge of the adjacent surfaces is located at a vertical position that is equal to or less than the vertical position of the leading edge of the previous surface. Additional surfaces are positioned on the side of the vehicle in a similar manner with each additional surface being located at an ever-increasing vertical position. The final surface is located on the side of the vehicle with the leading edge at a vertical position coincident with the highest edge of the side of the vehicle. The preferred embodiment of the invention is to have each of the surfaces, comprising the invention, that are located on the top of the vehicle will be orientated with the leading edge positioned inboard of the trailing edge. The surfaces distributed over the top of the vehicle will be evenly and symmetrically distributed about the vehicle centerline from the outer edge of the top surface to the vehicle centerline. The trailing edge of the surface located nearest the outer edge of the top surface will be coincident with the outer edge. The position of the adjacent surface on the top of the vehicle will be such that the trailing edge is located at a lateral position that is equal to or greater than the lateral position of the leading edge of the previous surface. Additional surfaces are positioned on the top of the vehicle in a similar manner with each additional surface located at an ever-increasing inboard position. The final surface that is located on the top of the vehicle will have the leading edge at a lateral position coincident with the vehicle centerline. This arrangement of the surfaces comprising the invention ensures that the surfaces are aligned at an angle to the surface flow for this class of ground vehicle.

The reduction of aerodynamic drag, improved operational performance and improved stability of multiple component vehicles is obtained by increasing the pressure loading on the bluff base of the vehicle or vehicle component. The pressure loading on the bluff base is increased by vortex structures that are generated on the exterior surfaces of the top and sides of a vehicle. The vortex structures flow into the bluff-base region of the vehicle and energize the wake flow emanating from the bluff base. The vortex structures have a preferred rotation direction that increases the mixing of the undercarriage flow with the bluff-base wake flow. The plurality of adjacent surfaces comprising the invention, extend perpendicularly from the exterior sides and top surfaces of the vehicle. More specifically, this invention relates to a device and method for reducing aerodynamic drag utilizing a plurality of adjacent surfaces that are specifically shaped, sized, and orientated to generate vortex structures that energizes the bluff-base wake and improves mixing of the undercarriage flow with the bluff-base wake. The vortex structures energize and stabilize the wake resulting in reduced unsteady flow separation, increased pressures acting on the bluff base area and reduced vehicle aerodynamic drag. The number of surfaces, the spacing between adjacent surfaces, the length of the surfaces, the width of the surfaces and the incidence of the surfaces to the flow are the primary design variables that are used to determine vortex strength and the drag reduction capability of the device. To ensure that a vortex is formed by the interaction of the side and top surface flow with the side edge of each surface, the thickness of each surface is minimized and the leading and side edges of each surface are made aerodynamically sharp.

The invention may be used to reduce the drag of all existing and future ground vehicles (i.e., cars with trailers, tractor-trailer trucks, trains, etc.).

Objects and Advantages

Several objects and advantages of the present invention are:

(a) to provide a novel process to reduce the aerodynamic drag of vehicles;
(b) to provide a means to use vortex structures to reduce aerodynamic drag;
(c) to provide a means to reduce the aerodynamic drag and improve the operational efficiency of vehicles;
(d) to provide a means to reduce the aerodynamic drag and improve the fuel efficiency of vehicles;
(e) to provide a means to conserve energy and improve the operational efficiency of vehicles;
(f) to provide a means to reduce the aerodynamic drag without a significant geometric modification to existing vehicles;
(g) to provide an aerodynamic drag reduction device that uses a plurality of adjacent surfaces;
(h) to allow the surface contour of each of the plurality of adjacent surfaces to be variable to meet the specific needs of the application;
(i) to allow the spacing, location, and orientation of each of the plurality of adjacent surfaces to be variable to meet the specific needs of the application;
(j) to create a number of high pressure and low aerodynamic drag forces on the bluff base of a vehicle that are used to reduce the aerodynamic drag of the subject vehicle;
(k) to allow the device to be fabricated as a number of independent surfaces that may be applied to an existing vehicle;
(l) to allow the device to be fabricated as a single independent unit that may be applied to an existing vehicle;
(m) to allow the device to be fabricated as an integral part of a vehicle;
(n) to allow for optimal positioning of each of the plurality of adjacent surfaces on the vehicle side surface;
(o) to allow for optimal positioning of each of the plurality of adjacent surfaces on the vehicle top surface;
(p) to have minimum weight and require minimum volume within the vehicle;
(q) to have minimum maintenance requirements;

Further objects and advantages are to provide a device that can be easily and conveniently used to minimize aerodynamic drag on any ground vehicle for the purposes of improving the operational performance of the vehicle. Still further objects and advantages will become apparent from a consideration of the ensuing description and drawings.

DETAILED DESCRIPTION OF THE INVENTION

The following descriptions are of exemplary embodiments of the invention only, and are not intended to limit the scope, applicability or configuration of the invention in any way. Rather the following description is intended to provide a convenient illustration for implementing various embodiments of the invention. As will become apparent, various changes may be made in the function and arrangement of the elements described herein without departing from the spirit and scope of the invention. For example, though not specifically described, many shapes, widths, leading edge shapes, spacing and orientation of the forward extended plurality of surfaces, candidate vehicles that can benefit from the device, fabrication means and material, attachments means and material should be understood to fall within the scope of the present invention.

Referring now in detail to the drawings, like numerals herein designate like numbered parts in the figures.

Figure 1:
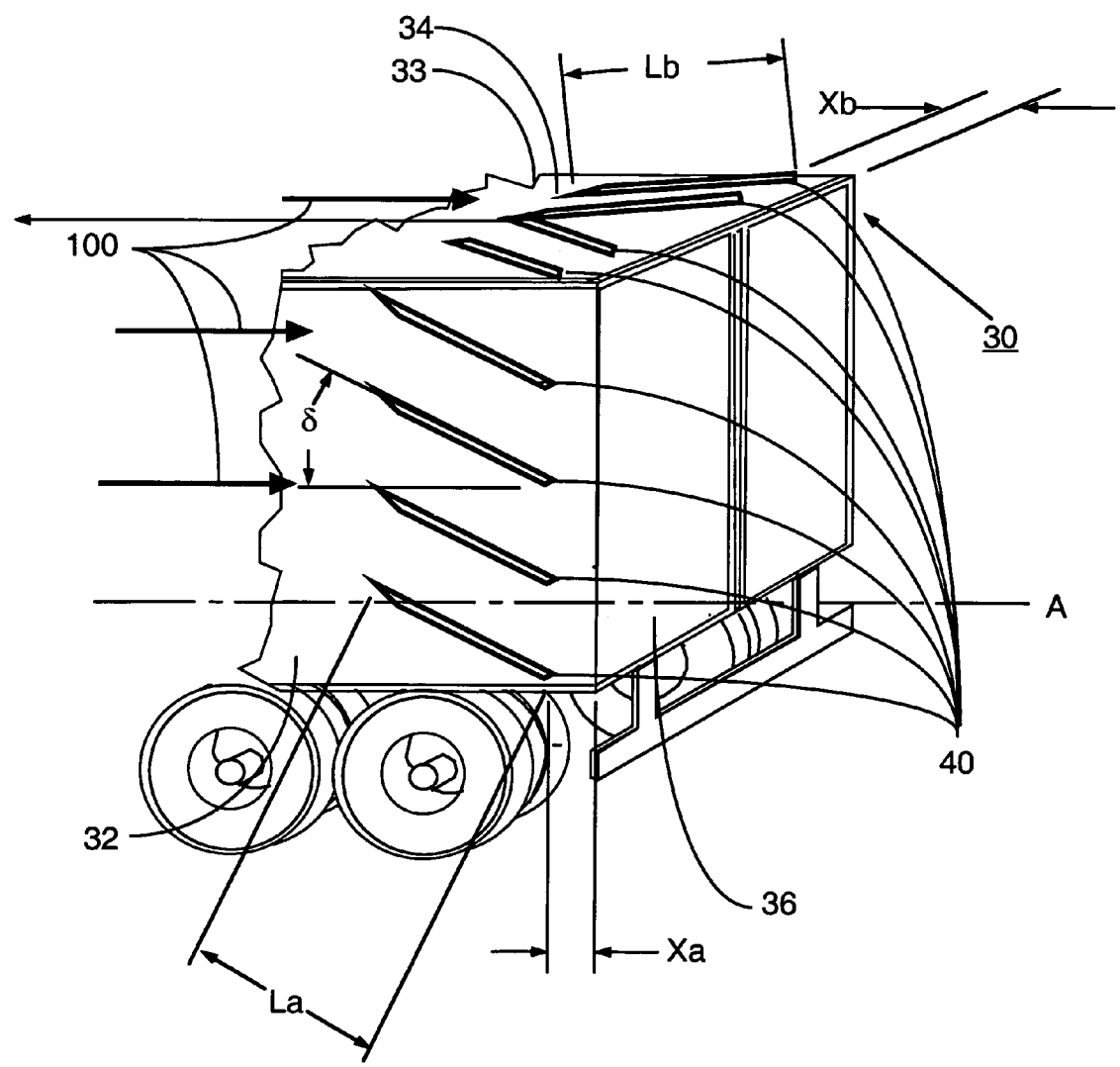
FIG. 1 is a rear perspective view of the aft most portion of a trailer of a tractor-trailer truck system with the subject invention installed on the two side surfaces and top surface of the trailer.

FIG. 1 is a rear perspective view of the aft portion of a typical trailer 30 of a tractor-trailer truck with the subject invention 40 installed on the exterior side surfaces 32 and 33 and exterior top surface 34 of a trailer 30. The number, shape, size, and orientation of the plurality of outward extended adjacent surfaces comprising the subject invention 40 are a function of the geometry of the trailer side surfaces 32 and 33, geometry of the trailer top surface 34 and the geometry of the trailer base surface 36. The subject invention 40 is comprised of a plurality of outward extended surfaces that are evenly distributed circumferentially about the aft portion of the vehicle. Each surface is inclined at an angle δ to the direction of the local flow 100 passing along the side surfaces 32 and 33 and the top surface 34 of the trailer 30.

The plurality of outward extended adjacent surfaces 40 that are attached to the side surfaces 32 and 33 of the vehicle are positioned forward of the base surface 36 a distance Xa. The distance Xa is determined by operational and maintenance requirements of the vehicle. The length La of the plurality of outward extended adjacent surfaces 40 attached to the side surfaces 32 and 33 of the trailer 30 is a function of the geometry of the side surface 32 and 33, the incidence angle δ and operational and maintenance requirements of the vehicle.

The plurality of outward extended adjacent surfaces 40 attached to the top surface 34 of the trailer 30 are positioned forward of the base surface 36 a distance Xb. The distance Xb is determined by operational and maintenance requirements. The length Lb of the plurality of outward extended adjacent surfaces comprising the invention 40 attached to the top surface 34 of the trailer 30 is a function of the geometry of the top surface 34, the incidence angle δ and operational and maintenance requirements of the vehicle.

The subject invention 40 provides aerodynamic drag reduction for all free stream flow 100 conditions including crosswind conditions. The subject invention 40 takes advantage of all flow 100 conditions to provide increased aerodynamic drag reduction. Aerodynamic drag reduction occurs when flow 100 encounters the leading edge and outward facing side edge of each of the plurality of outward extended surfaces comprising the subject invention 40. The flow 100 impinging on the leading edge and outward facing side edge of each surface separates and forms and a vortex. The vortex shed from each surface comprising the invention 40 flows downstream and exits the trailing edge of both exterior side surfaces 32 and 33 and the trailing edge of the exterior top surface 34. The vortices generated by the subject invention 40 then pass into the vehicle base area and energize the bluff-base wake flow. The vortices generate a stable bluff-base wake flow and a high pressure that acts on the exterior base surface 36 of the trailer 30. The strength of the vortices formed by the device 40 and thus the aerodynamic drag reduction will increase with increasing velocity of the flow 100. The vortex structures generated by the invention 40 have a preferred rotation in order to increase the mixing of the undercarriage flow with the bluff-base wake flow. The subject invention is comprised of a plurality of outward extended adjacent surfaces 40 that are evenly distributed circumferentially about the perimeter of the vehicle.

FIG. 2a through FIG. 2d show flow patterns in the wake of a bluff-base tractor-trailer truck with and without the present invention 40 installed. In FIG. 2a through FIG. 2d the airflow about the vehicle and in the base region is represented by arrow tipped lines and swirl structures 100, 110, 120, 130 and 140. The conical shaped structures with arrow tipped lines represent vortices 130 generated by the subject invention 40. The shaded swirl structures represent rotational wake flow 110. The small swirl structures represent turbulent flow structures 120 in the base area and from the vehicle undercarriage.

Figure 2A:
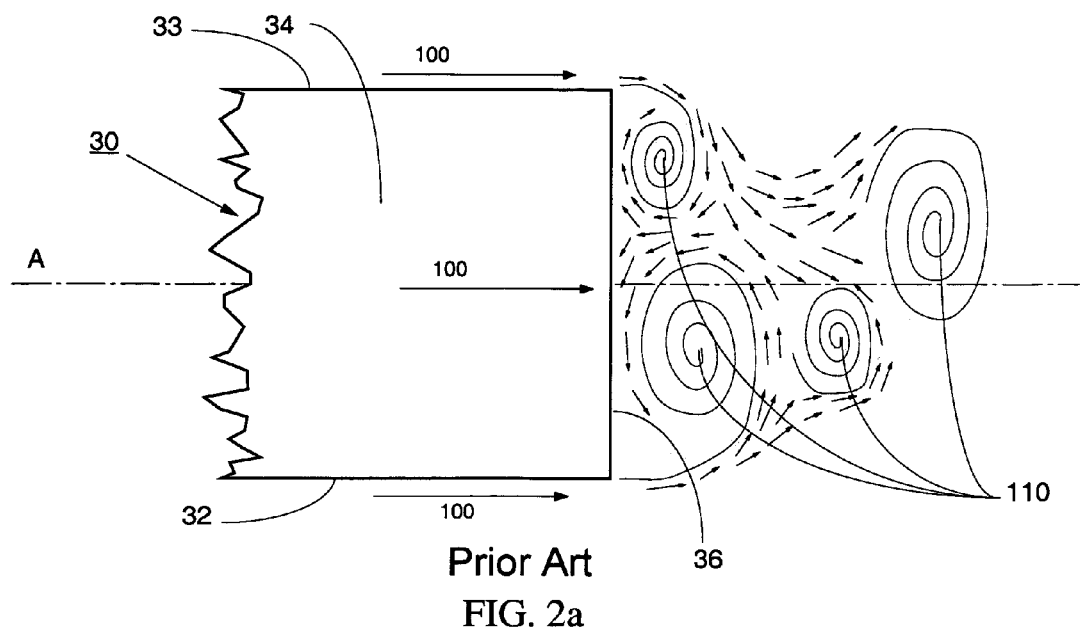
FIG. 2a to 2b are cross section views, in planes horizontal to the ground (FIG. 2a) and perpendicular to the ground (FIG. 2b), of the wake flow conditions for a tractor-trailer system without the subject invention installed.

FIG. 2a show a top view of the aft portion of a trailer 30 and a cross section view, in a plane horizontal to the ground, of the bluff-base wake flow, without the subject invention installed. For this condition, a surface flow 100 develops on the trailer that separates at the trailing edge of the side surfaces 32 and 33, and forms rotational-flow structures 110 that comprise the bluff-base wake flow. The rotational-flow structures 110 are shed asymmetrically from the opposing side surfaces 32 and 33. These rotational-flow structures 110 continue to move downstream in a random pattern. The asymmetric shedding of the rotational-flow structures 110 produce low pressures that act on the base surface 36 of the trailer. These low pressures result in a high aerodynamic drag force. The low energy flow 100 separating at the trailing edges of the side surfaces 32 and 33 of the trailer 30 is unable to energize and stabilize the low energy bluff-base wake flow. The resulting bluff-base wake-flow structure emanating from the base area of the vehicle is comprised of the vortex structures 110 that are shed from trailing edges of the side surfaces 32 and 33 of the trailer 30. Contributing to the low-energy bluff-base wake is the low-energy turbulent flow 120 that exits from the vehicle undercarriage at the base of the vehicle.

Figure 2B:
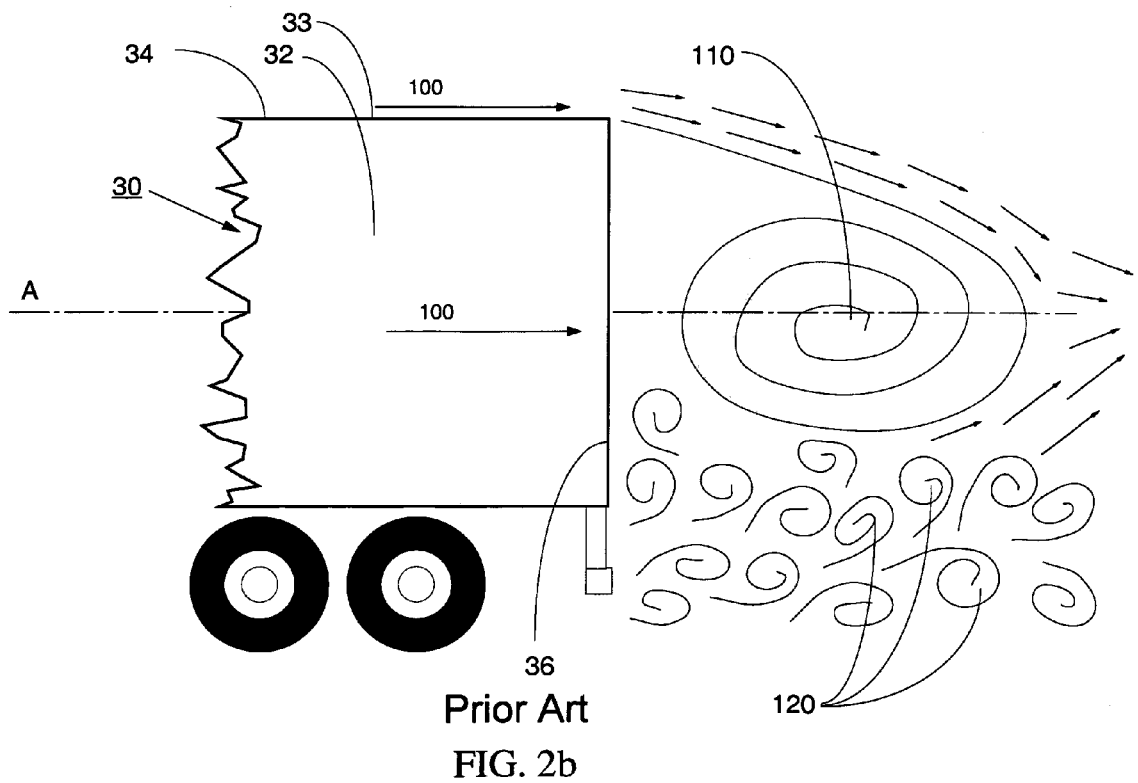

FIG. 2b show a side view of the aft portion of a trailer 30 and a centerline cross-section view of the bluff-base wake flow, without the subject invention installed. For this condition, a surface flow 100 develops on the trailer that separates at the trailing edge of the top surface 34 and forms rotational-flow structures 110 that comprise the bluff-base wake flow. The rotational-flow structures 110 that are shed from the trailing edge of the top surface 34 are asymmetrically located in the wake. These rotational-flow structures 110 continue to move downstream in a random pattern. The unsteady shedding of the rotational-flow structures 110 produce low pressures that act on the base surface 36 of the trailer. These low pressures result in a high aerodynamic drag force. The low energy flow 100 separating at the trailing edges of the top surface 34 of the trailer 30 is unable to energize and stabilize the low energy bluff-base wake flow. Contributing to the low-energy bluff-base wake is the low-energy turbulent flow 120 that exits from the vehicle undercarriage at the trailing edge of the vehicle. The resulting bluff-base wake-flow structure emanating from the base area of the vehicle is comprised of the vortex structures 110 that are shed from trailing edges of the side surfaces 32 and 33 and the top surface 34 of the vehicle. The low-energy turbulent flow 120 that exists from the vehicle undercarriage also enters into the bluff-base wake flow. The unsteady wake flow imparts a low pressure onto the aft facing surface 36 of the trailer base that results in significant aerodynamic drag.

Figure 2C:
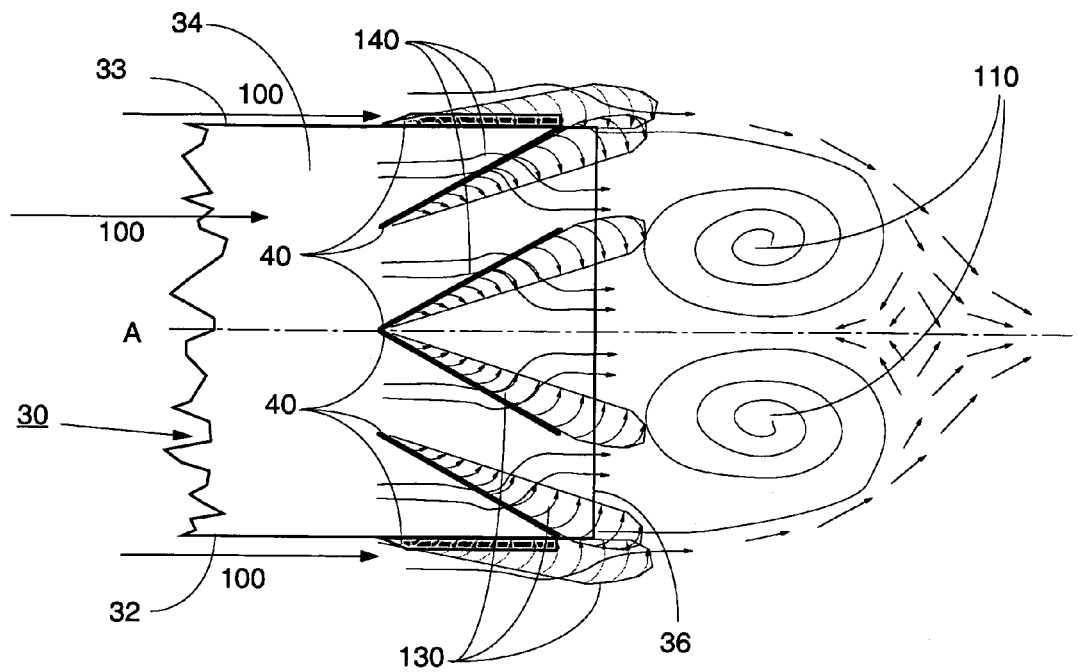
FIG. 2c to 2d are cross section views, in planes horizontal to the ground (FIG. 2c) and perpendicular to the ground (FIG. 2d), of the wake flow conditions for a tractor-trailer system with the subject invention installed
Figure 2D:
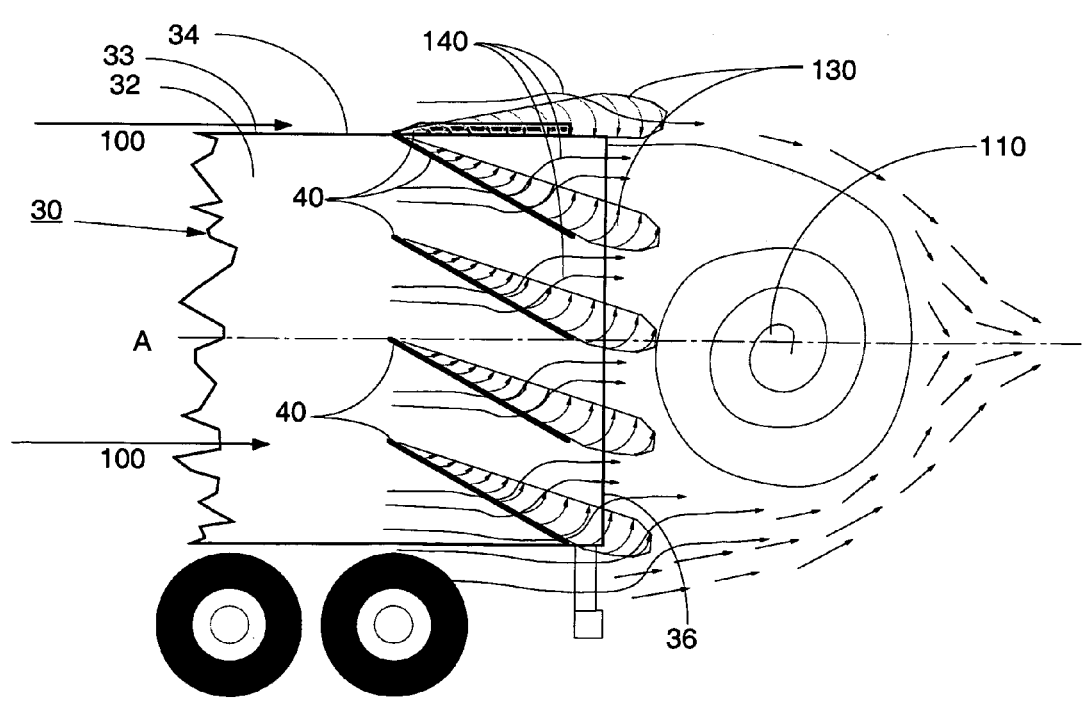

FIG. 2c and FIG. 2d show a top view and a side view of the aft portion of a trailer 30 and cross section views in a plane horizontal to the ground and along the vehicle centerline of the bluff-base wake flow, with the subject invention 40 installed. For this condition, a surface flow 100 develops on the trailer 30 exterior top surface 34 and exterior side surfaces 32 and 33 that impinge on the leading edge and outward facing side edge of each outward-extended surface comprising the subject invention 40. The flow 100 impinging on the plurality of outward-extended adjacent surfaces separates and forms vortices 130. The plurality of outward-extended adjacent surfaces, comprising the subject invention 40, is symmetrically positioned on the trailer 30 top exterior surface 34 and side exterior surfaces 32 and 33 about the vehicle centerline. Each surface of the subject invention 40 is inclined at an angle δ to the direction of the local flow 100. Each surface 40 of the subject invention is designed to generate a coherent vortex structure 130. The invention 40 generates a plurality of vortices 130 that are symmetrically orientated about the centerline of the trailer 30. The vortices 130 move downstream in a symmetric pattern and exit the top surface 34 and side surfaces 32 and 33 at the trailing edge of the vehicle 30 and enter into the base region of the vehicle 30. The vortices 130 energize the bluff-base wake flow. The vortices 130 generate a stable bluff-base wake flow and a high pressure that acts on the base surface 36 of the trailer 30. The strength of the vortices 130 formed by the device 40 and thus the aerodynamic drag reduction benefit will increase with increasing velocity of the flow 100. The vortex structure generated by the invention 40 has a preferred rotation in order to increase the mixing of the undercarriage flow with the bluff-base wake flow.

Figure 3A:
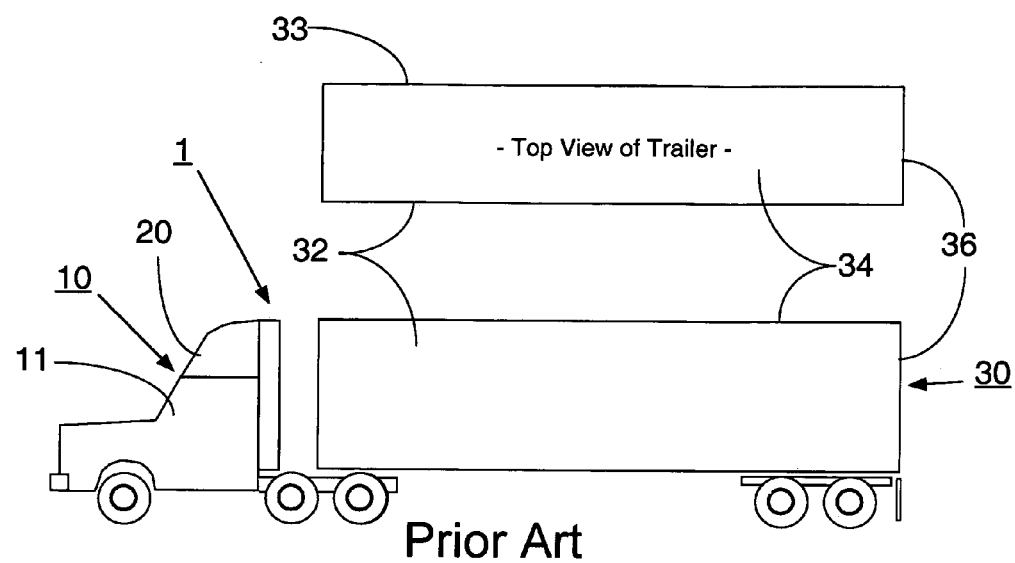
FIG. 3a to 3d are side and top views of various ground vehicles with and without the subject invention installed.
Figure 3B:
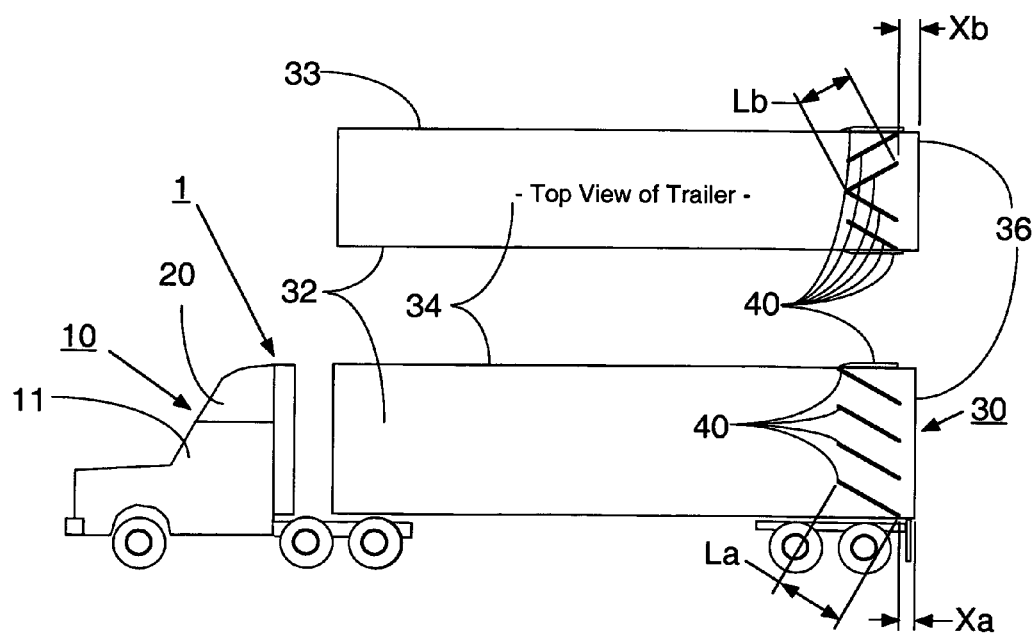
Figure 3C:
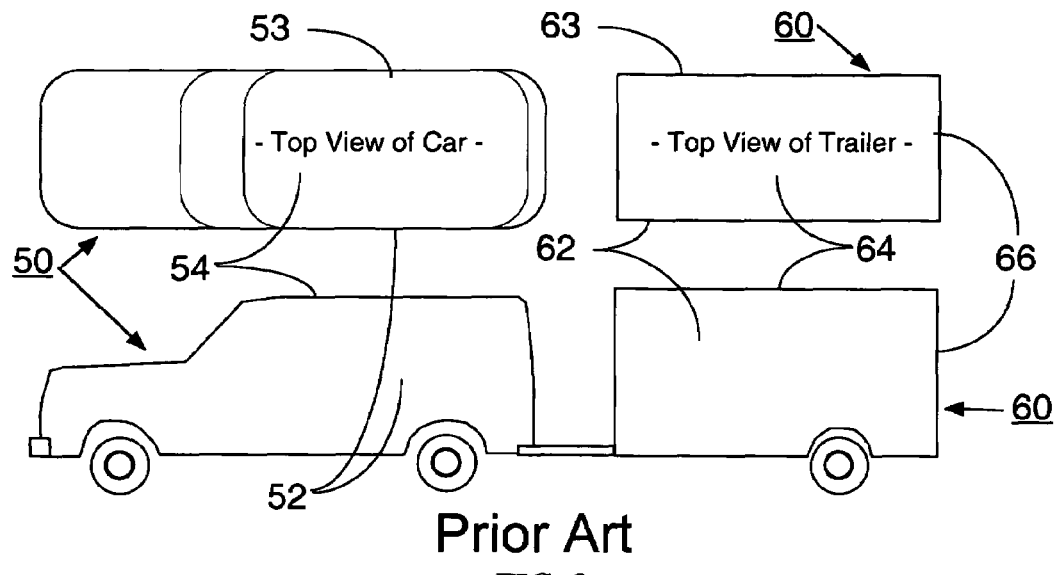
Figure 3D:
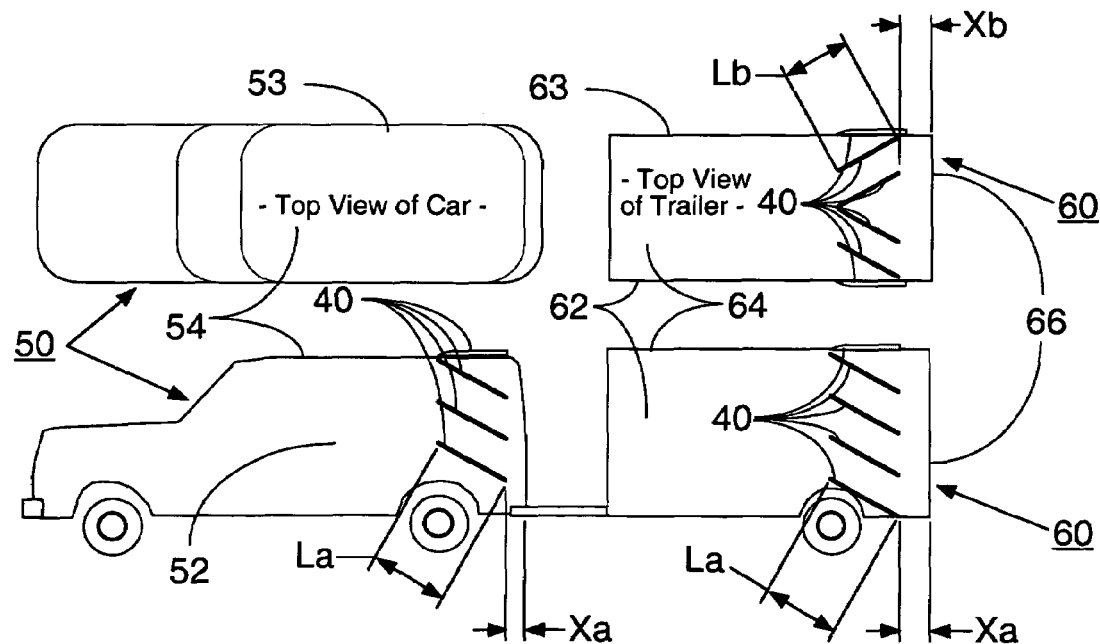

FIG. 3a through FIG. 3d are side and top views of example ground vehicles with and without the subject invention installed. FIG. 3a shows a typical tractor-trailer truck system 1, comprised of a powered tractor 10 that pulls a trailer 30. The tractor 10 is comprised of a cab 11 and an aerodynamic fairing system 20 that may be an integral part of the tractor 10. FIG. 3b shows the same tractor-trailer truck system 1 as that of FIG. 3a with the subject invention 40 installed on the side surfaces 32 and 33 and the top surface 34 of the trailer 30. The plurality of outward extend adjacent surfaces that comprise the invention 40 are symmetrically distributed in a circumferential row located at the rear of the trailer 30. FIG. 3c and FIG. 3d show an automobile 50 pulling a trailer 60 with and without the subject invention 40 installed on both the automobile exterior side surfaces 52, 53 and the exterior top surface 54 and the trailer exterior side surfaces 62, 63 and the exterior top surface 64. The plurality of outward extend adjacent surfaces that comprise the invention 40 are symmetrically distributed in a circumferential row located at the rear of the automobile 50 and the trailer 60. The various vehicles depicted in FIG. 3 shows a powered vehicle towing/pulling an un-powered towed vehicle. Additionally, other multiple component vehicles may be considered than those depicted.

Figure 4A:
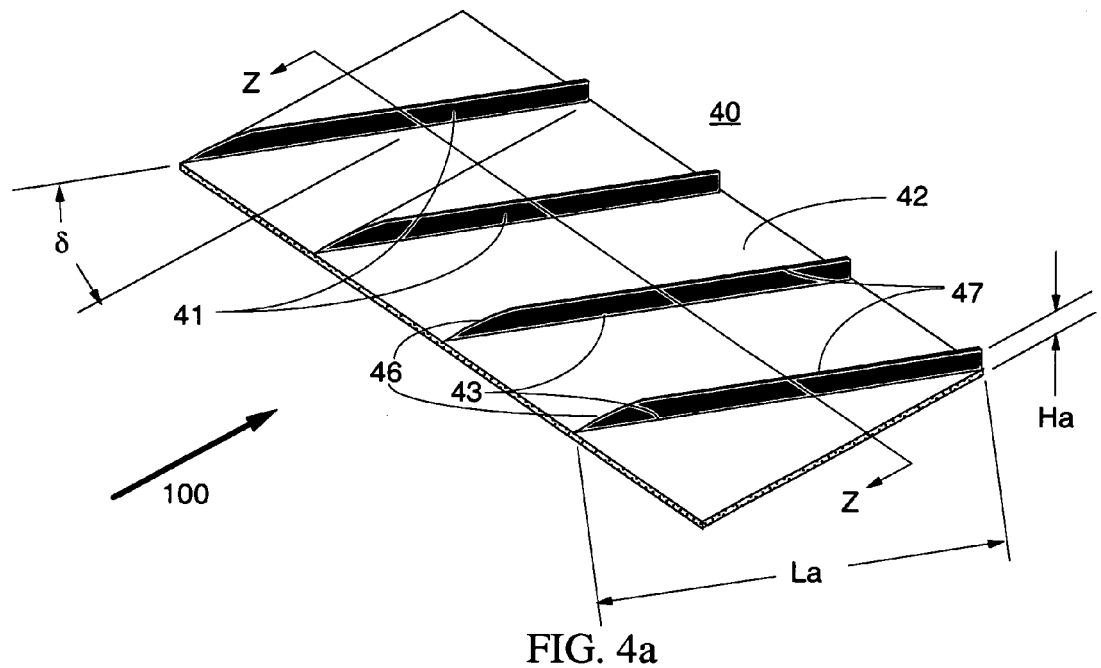
FIG. 4a to 4c are a perspective view and two cross section views of a fabrication and attachment technique for the subject invention applied to a vehicle.
Figure 4B:
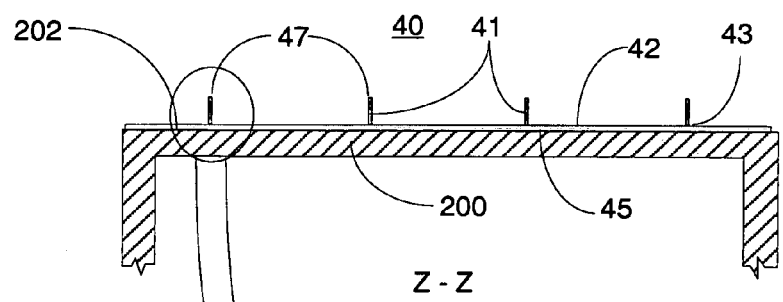
Figure 4C:
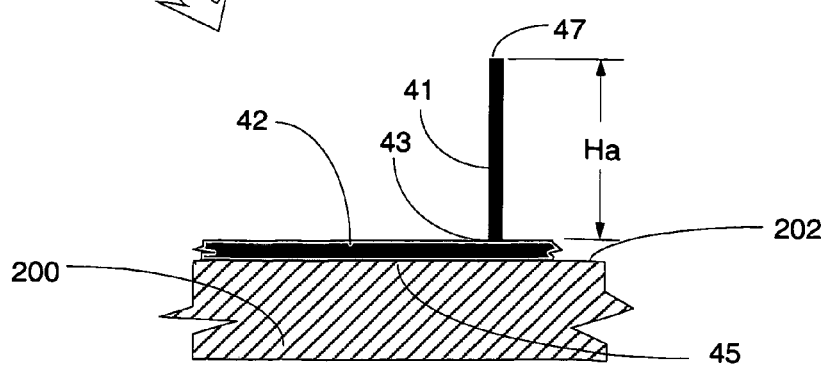

FIG. 4a through FIG. 4f are perspective views and cross section views of the subject invention 40 fabricated as a single independent unit that may be applied or attached to an existing vehicle or vehicle component. FIG. 4a through FIG. 4c show the subject invention 40 fabricated as a single independent unit for attachment to the exterior surface of a vehicle. FIG. 4a show the invention 40 fabricated as a single independent unit consisting of a plurality of outward extended adjacent surfaces 41, a base plate 42 and means 43 to attach the outward extended adjacent surfaces 41 to the base plate 42. Each of the plurality of outward extended adjacent surfaces 41 have a length La and are orientated on the base plate 42 at an angle δ. Each of the plurality of outward extended adjacent surfaces 41 have a leading edge 46 and an outward facing side edge 47. FIG. 4b show a cross section cut of the invention 40, fabricated as a single independent unit, attached to the exterior surface 202 of a vehicle 200. FIG. 4c show a cross section cut of one outward extended adjacent surfaces 41 of the invention 40. The sketch show the surface 41 extends perpendicularly from the surface of the vehicle a distance Ha. The angle δ and dimensions La and Ha are determined by the geometry of the vehicle 200 and direction of the air flow 100. Example material for the outward extended adjacent surfaces 41 and the base plate 42 may be any light-weight and structurally sound wood, metal, plastic, composite or other suitable material. The material for the outward extended adjacent surfaces 41 and the base plate 42 may differ or may be of the same material and fabricated as a single component. The attachment means 43 may consist of bonding, welding or other appropriate structural attachments. The subject invention 40 is attached to the exterior surface 202 of a vehicle 200 by a means 45. The attachments means 45 may consist of bonding, mechanical fasteners or other appropriate means.

Figure 4D:
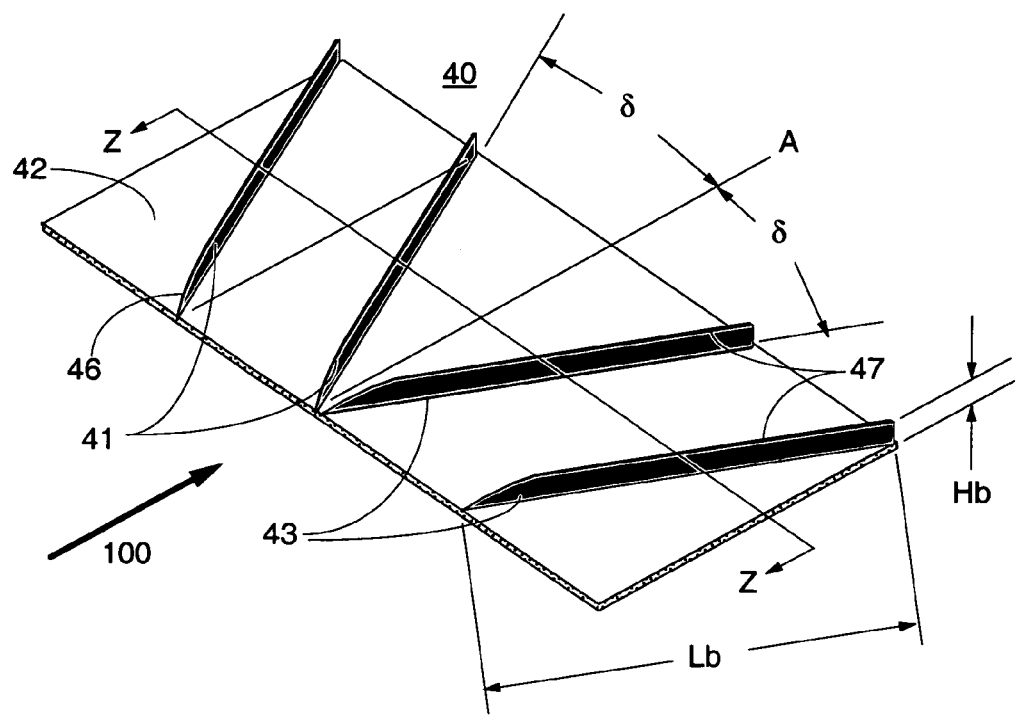
FIG. 4d to 4f are a perspective view and two cross section views of a fabrication and attachment technique for the subject invention applied to a vehicle.
Figure 4E:
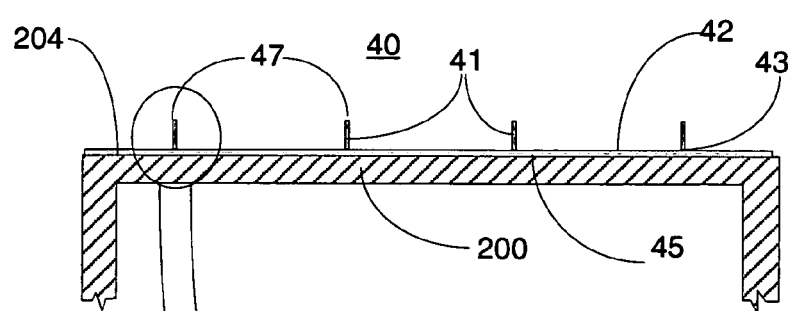
Figure 4F:
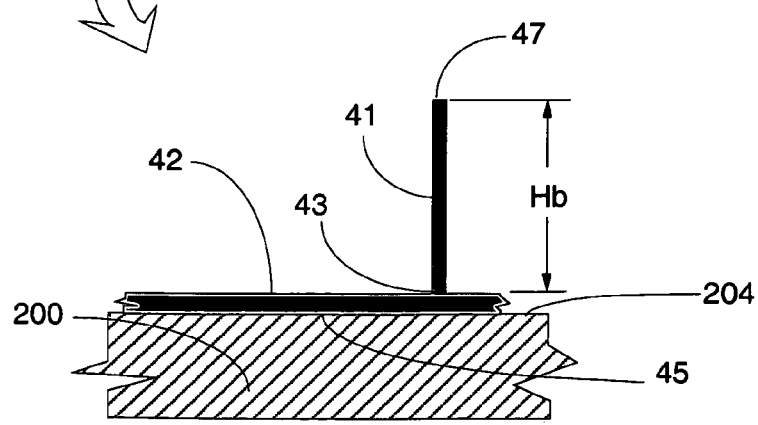

FIG. 4d through FIG. 4f show the subject invention 40 fabricated as a single independent unit for attachment to the exterior surface 204 of a vehicle 200. FIG. 4d show the invention 40 fabricated as a single independent unit consisting of a plurality of outward extended adjacent surfaces 41, a base plate 42 and means 43 to attach the outward extended adjacent surfaces 41 to the base plate 42. The plurality of outward extended adjacent surfaces 41 is orientated in a symmetric pattern about the centerline A of the vehicle 200. Each of the plurality of outward extended adjacent surfaces 41 have a length Lb and are orientated on the base plate 42 at an angle δ. Each of the plurality of outward extended adjacent surfaces 41 have a leading edge 46 and an outward facing side edge 47. FIG. 4e show a cross section cut of the invention 40, fabricated as a single independent unit, attached to the exterior surface 204 of a vehicle 200. FIG. 4f show a cross section cut of one outward extended adjacent surfaces 41 of the invention 40. The sketch show the surface 41 extends perpendicularly from the surface of the vehicle a distance Hb. The angle δ and dimensions Lb and Hb are determined by the geometry of the vehicle 200 and direction of the air flow 100. Example material for the outward extended adjacent surfaces 41 and the base plate 42 may be any light-weight and structurally sound wood, metal, plastic, composite or other suitable material. The material for the outward extended adjacent surfaces 41 and the base plate 42 may differ or may be of the same material and fabricated as a single component. The attachment means 43 may consist of bonding, welding or other appropriate structural attachments. The subject invention 40 is attached to the exterior surface 204 of a vehicle 200 by a means 45. The attachments means 45 may consist of bonding, mechanical fasteners or other appropriate means.

Figure 5A:
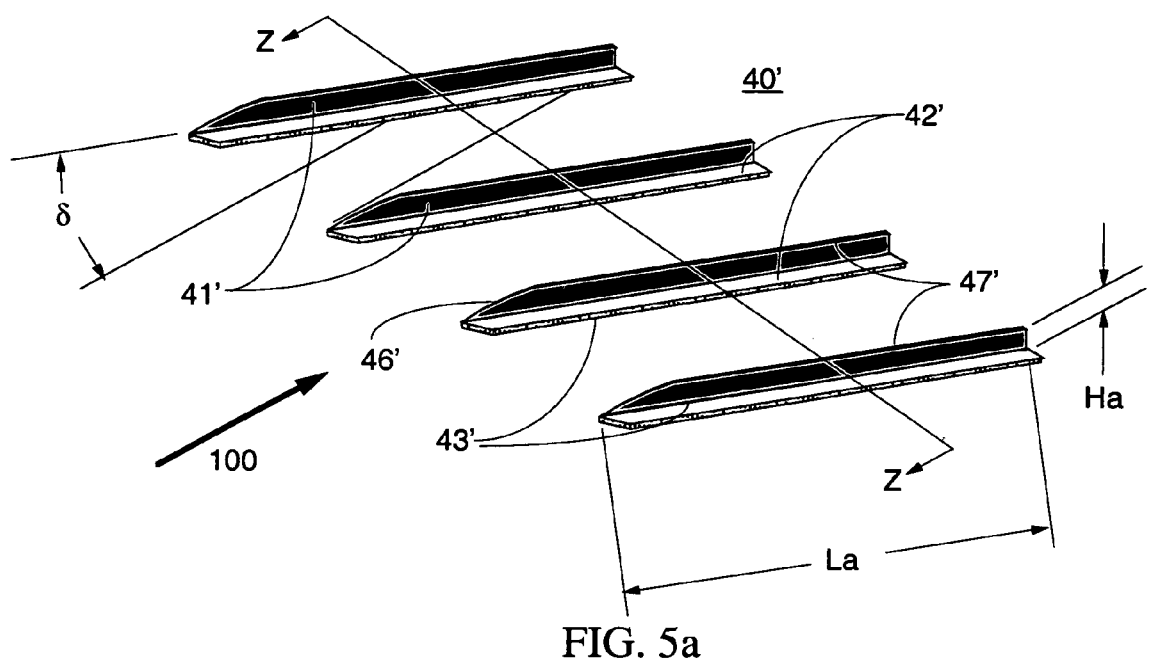
FIG. 5a to 5c are a perspective view and two cross section views of a fabrication and attachment technique for the subject invention applied to a vehicle.
Figure 5B:
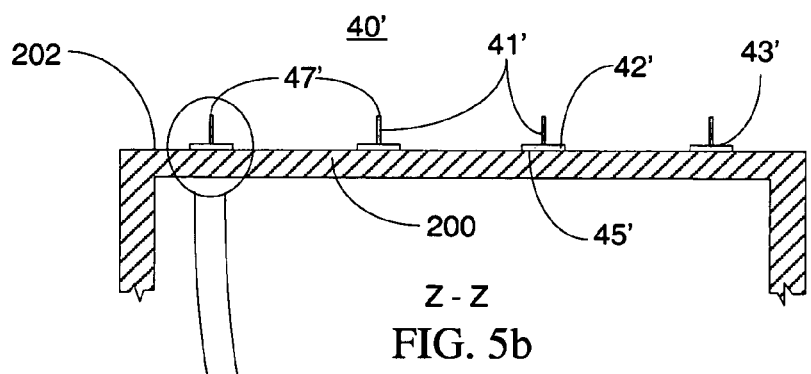
Figure 5C:
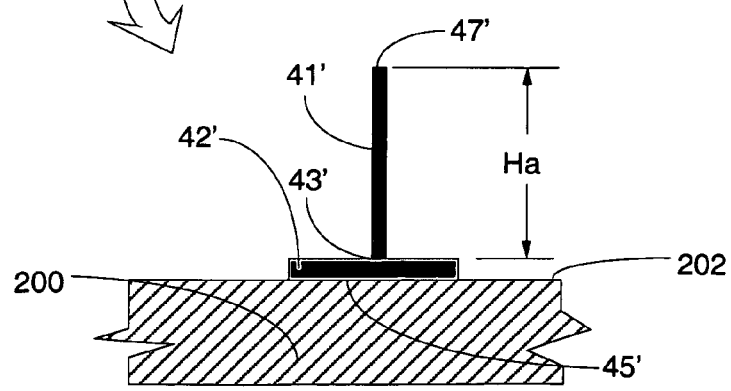

FIG. 5a through FIG. 5f are perspective views and cross section views of the subject invention 40' fabricated as a plurality of independent structures that may be applied or attached to an existing vehicle or vehicle component. FIG. 5a through 5c. show the subject invention 40' fabricated as a plurality of independent structures for attachment to the exterior surface 202 of a vehicle 200. FIG. 4a show the invention 40' fabricated as a plurality of independent structures with each structure consisting of an outward extended adjacent surface 41', a base plate 42' and means 43' to attach the outward extended adjacent surface 41' to the base plate 42'. Each outward extended adjacent surface 41' has a length La and a height Ha. Each of the plurality of independent structures is orientated on the side of vehicle at an angle δ. Each of the plurality of outward extended adjacent surfaces 41' have a leading edge 46' and an outward facing side edge 47'. FIG. 5b show a cross section cut of the invention 40', fabricated as a plurality of independent structures, attached to the exterior surface 202 of a vehicle 200. FIG. 5c show a cross section cut of one outward extended adjacent surfaces 41' of the invention 40'. The sketch show the surface 41' extends perpendicularly from the surface of the vehicle a distance Ha. The angle δ and dimensions La and Ha are determined by the geometry of the vehicle 200 and direction of the air flow 100. Example material for the outward extended adjacent surfaces 41' and the base plate 42' may be any light-weight and structurally sound wood, metal, plastic, composite or other suitable material. The material for the outward extended adjacent surfaces 41' and the base plate 42' may differ or may be of the same material and fabricated as a single component. The attachment means 43' may consist of bonding, welding or other appropriate structural attachments. The plurality of independent structures comprising the subject invention 40' is attached to the exterior surface 202 of a vehicle 200 by a means 45'. The attachments means 45' may consist of bonding, mechanical fasteners or other appropriate means.

Figure 5D:
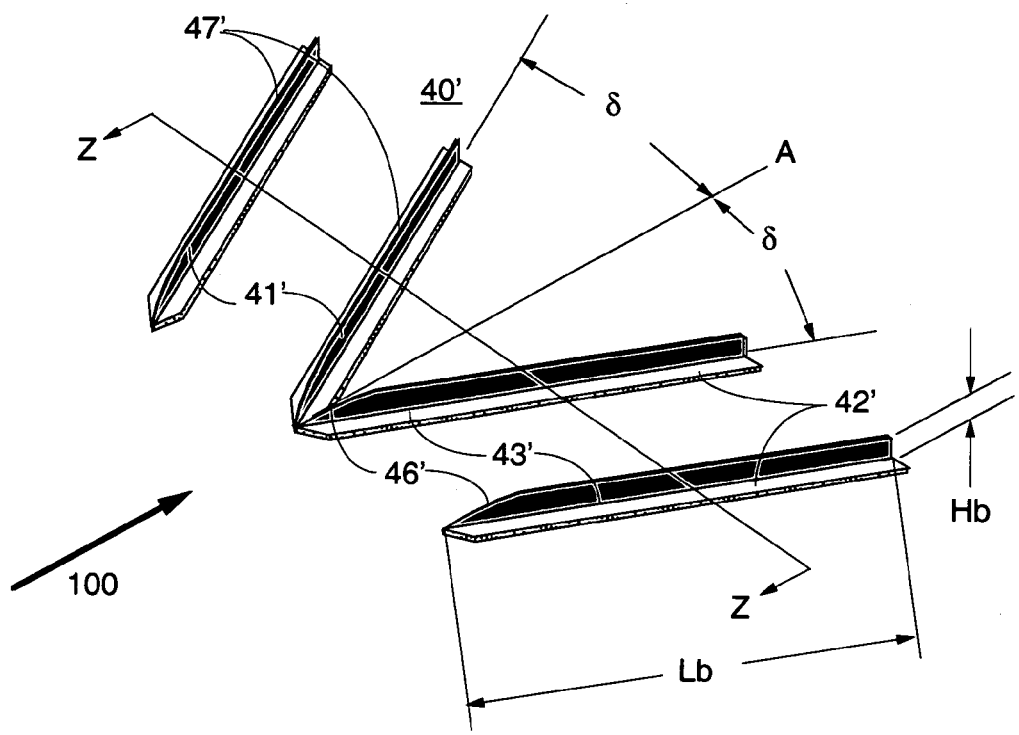
FIG. 5d to 5f are a perspective view and two cross section views of a fabrication and attachment technique for the subject invention applied to a vehicle.
Figure 5E:
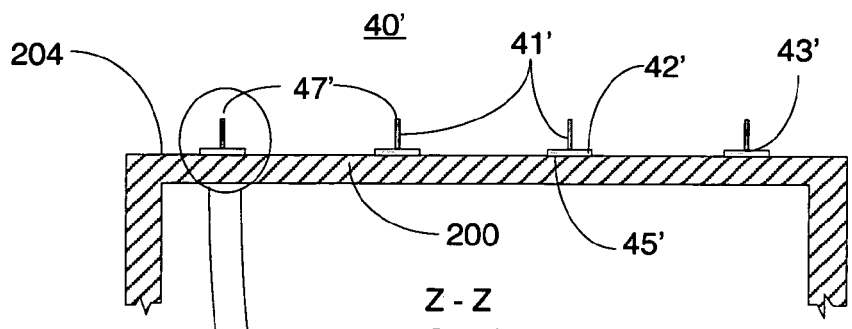
Figure 5F:
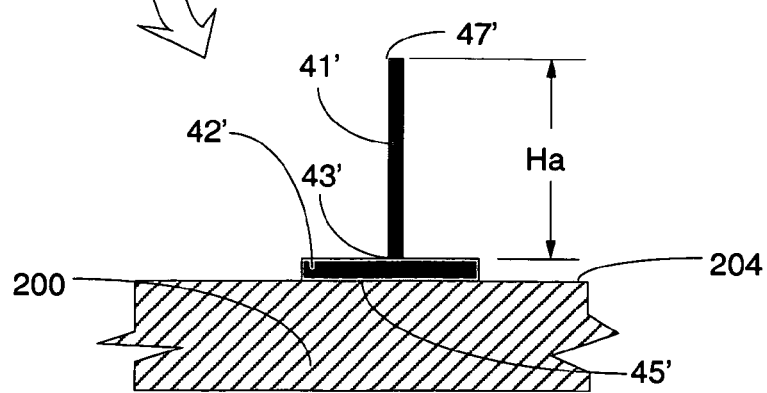

FIG. 5d through FIG. 5f show the subject invention 40' fabricated as a plurality of independent structures for attachment to the exterior surface 204 of a vehicle 200. FIG. 5d show the invention 40' fabricated as a plurality of independent structures with each independent structure consisting of an outward extended adjacent surface 41', a base plate 42' and means 43' to attach the outward extended adjacent surface 41' to the base plate 42'. Each of the plurality of independent structures comprising the invention 40' is orientated in a symmetric pattern about the centerline A of the vehicle 200. Each of the plurality of independent structures comprising the invention 40' has a length Lb and are orientated on the exterior surface 204 of the vehicle 200 at an angle δ. Each of the plurality of outward extended adjacent surfaces 41' have a leading edge 46' and an outward facing side edge 47'. FIG. 5e show a cross section cut of the invention 40', fabricated as a plurality of independent structures, attached to the exterior surface 204 of a vehicle 200. FIG. 5f show a cross section cut of one outward extended adjacent surface 41' of the invention 40'. The sketch show the surface 41' extends perpendicularly from the surface of the vehicle a distance Hb. The angle δ and dimensions Lb and Hb are determined by the geometry of the vehicle 200 and direction of the air flow 100. Example material for the outward extended adjacent surfaces 41' and the base plate 42' may be any light-weight and structurally sound wood, metal, plastic, composite or other suitable material. The material for the outward extended adjacent surfaces 41' and the base plate 42' may differ or may be of the same material and fabricated as a single component. The attachment means 43' may consist of bonding, welding or other appropriate structural attachments. The subject invention 40' is attached to the exterior surface 204 of a vehicle 200 by a means 45'. The attachments means 45' may consist of bonding, mechanical fasteners or other appropriate means.

Figure 6A:
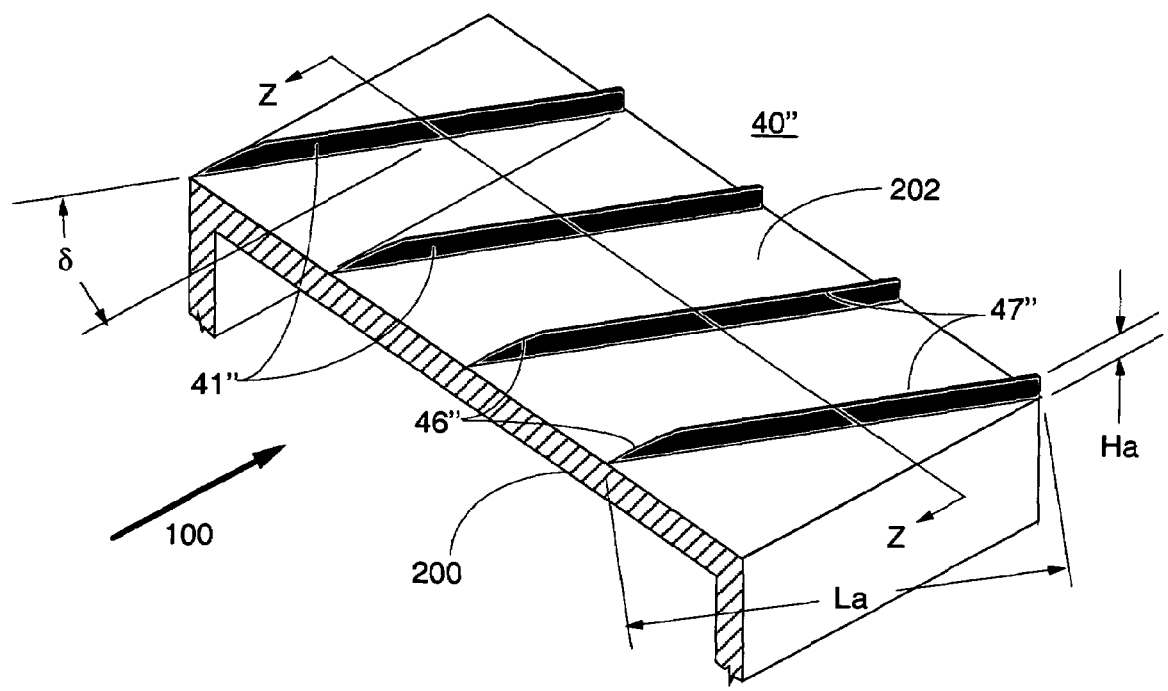
FIG. 6a to 6c are a perspective view and two cross section views of the subject invention fabricated as an integral part of a vehicle.
Figure 6B:
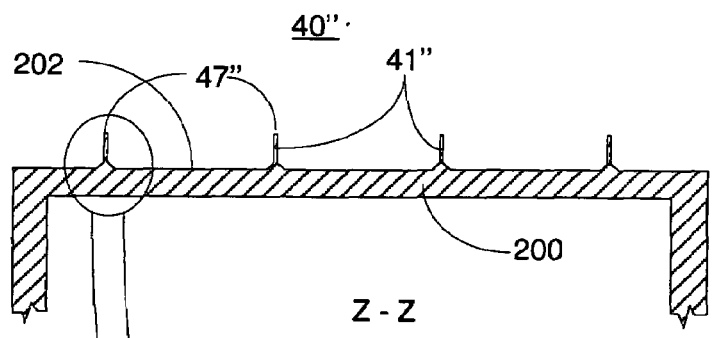
Figure 6C:
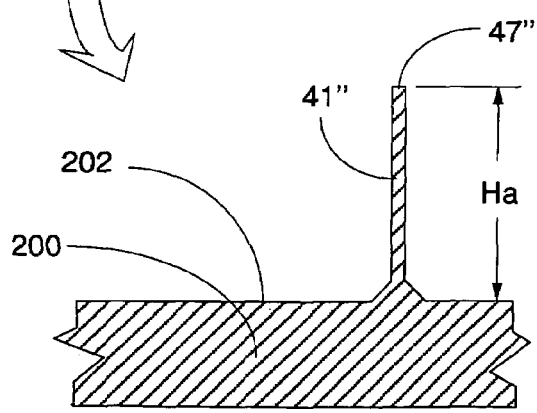

FIG. 6a through FIG. 6f are perspective views and cross section views of the subject invention 40" fabricated as an integral part of an existing vehicle 200 or vehicle component. FIG. 6a through FIG. 6c show the subject invention 40" fabricated as an integral part of the exterior surface 202 of a vehicle 200. FIG. 6a show the invention 40" fabricated as an integral part of an existing vehicle 200 with the subject invention consisting of a plurality of outward extended adjacent surfaces 41" fabricated as part of the surface 202. Each outward extended adjacent surface 41" has a length La and a height Ha. Each of the plurality of independent structures is orientated on the vehicle at an angle δ. Each of the plurality of outward extended adjacent surfaces 41" have a leading edge 46" and an outward facing side edge 47". FIG. 6b show a cross section cut of the invention 40", fabricated as an integral part of the surface 202 of a vehicle 200. FIG. 6c show a cross section cut of one outward extended adjacent surfaces 41" of the invention 40". The sketch show the surface 41" extends perpendicularly from the surface of the vehicle a distance Ha. The angle δ and dimensions La and Ha are determined by the geometry of the vehicle 200 and direction of the air flow 100. Example material for the outward extended adjacent surfaces 41" may be any light-weight and structurally-sound wood, metal, plastic, composite or other suitable material. The material for the outward extended adjacent surfaces 41" and the vehicle 200 may differ or may be of the same material and fabricated as a single component. The plurality of independent structures comprising the subject invention 40" is fabricated as part of the exterior surface 202 of a vehicle 200.

Figure 6D:
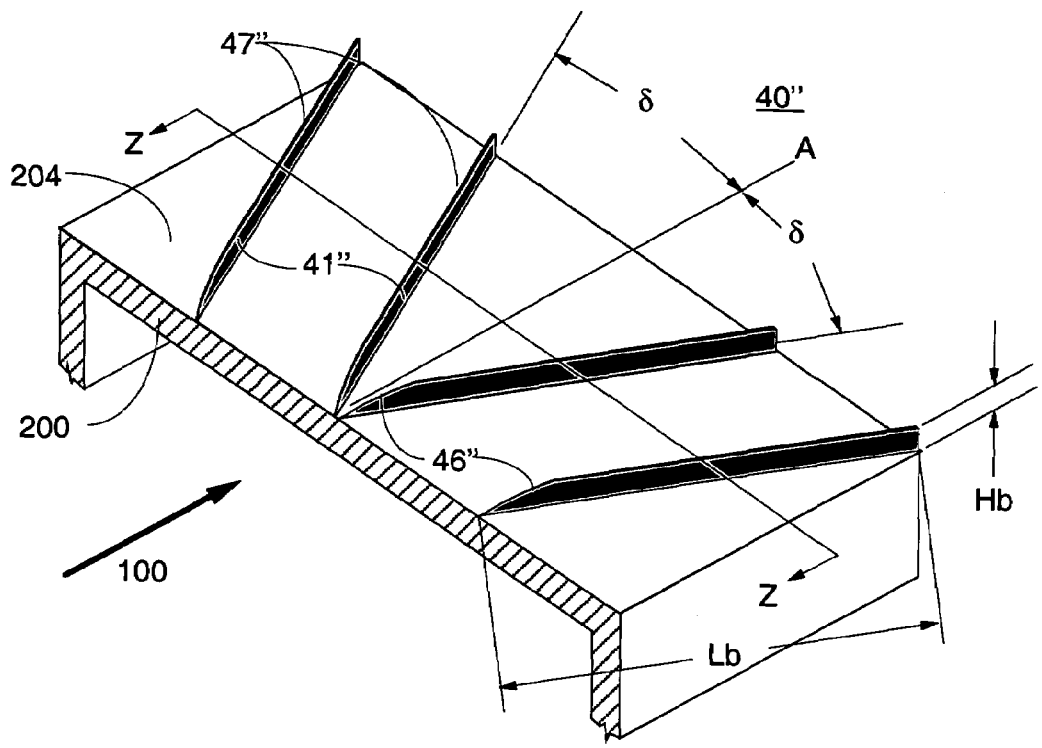
FIG. 6d to 6f are a perspective view and two cross section views of the subject invention fabricated as an integral part of a vehicle.
Figure 6E:
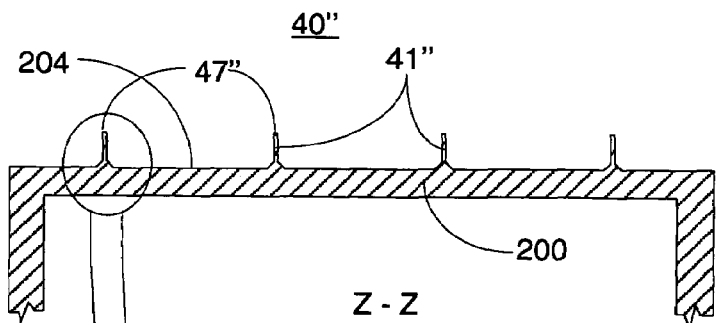
Figure 6F:
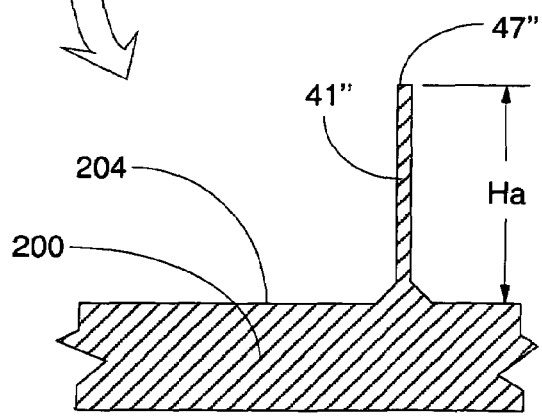

FIG. 6d through FIG. 6f show the subject invention 40" fabricated as an integral part of the exterior surface 204 of a vehicle 200. FIG. 6d show the invention 40" fabricated as an integral part of the surface 204 of a vehicle 200 consisting of a plurality of outward extended adjacent surfaces 41". Each of the plurality of outward extended adjacent surfaces 41" comprising the invention 40" is orientated in a symmetric pattern about the centerline A of the vehicle 200. Each of the plurality of outward extended adjacent surfaces 41" comprising the invention 40" has a length Lb and is orientated on the surface 204 of the vehicle 200 at an angle δ. Each of the plurality of outward extended adjacent surfaces 41" have a leading edge 46" and an outward facing side edge 47". FIG. 6e show a cross section cut of the invention 40"', fabricated as a plurality of outward extended adjacent surfaces 41", attached to the top surface 204 of a vehicle 200. FIG. 6f show a cross section cut of one outward extended adjacent surface 41" of the invention 40". The sketch show the surface 41" extends perpendicularly from the surface of the vehicle a distance Hb. The angle δ and dimensions Lb and Hb are determined by the geometry of the vehicle 200 and direction of the air flow 100. Example material for the outward extended adjacent surfaces 41" may be any lightweight and structurally sound wood, metal, plastic, composite or other suitable material. The material for the outward extended adjacent surfaces 41" and the vehicle 200 may differ or may be of the same material. The subject invention 40" is attached to the exterior surface 204 of a vehicle 200.

Figure 7A:
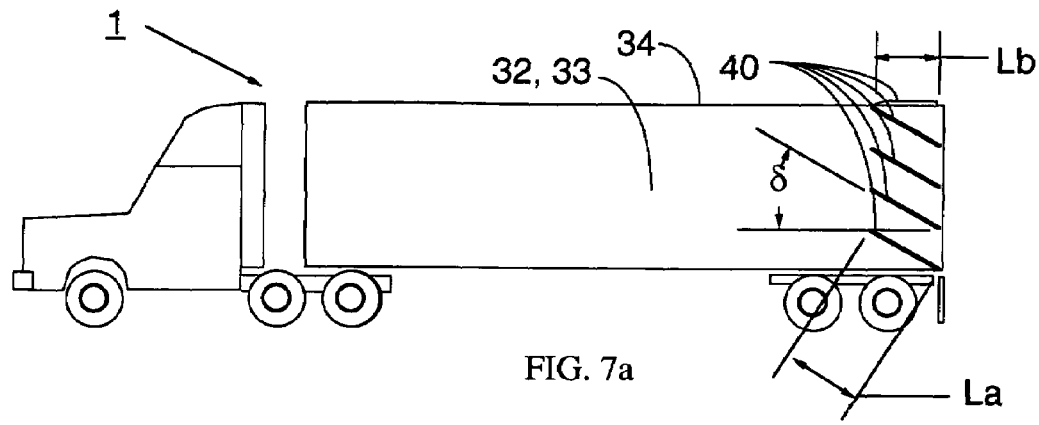
FIG. 7a to 7d are side views of alternate embodiments of the subject invention installed on a tractor-trailer truck.
Figure 7B:
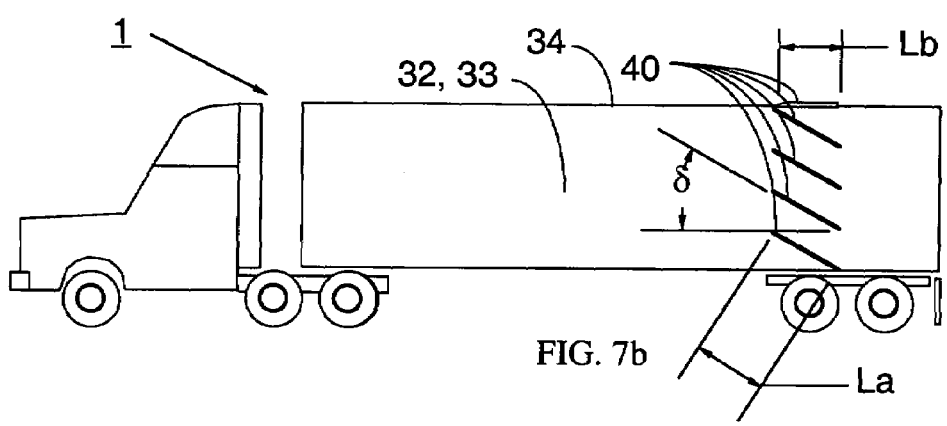
Figure 7C:
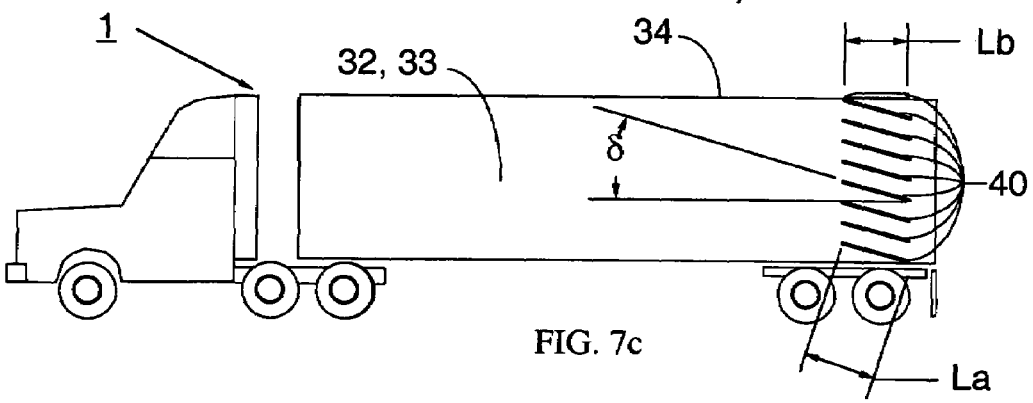
Figure 7D:
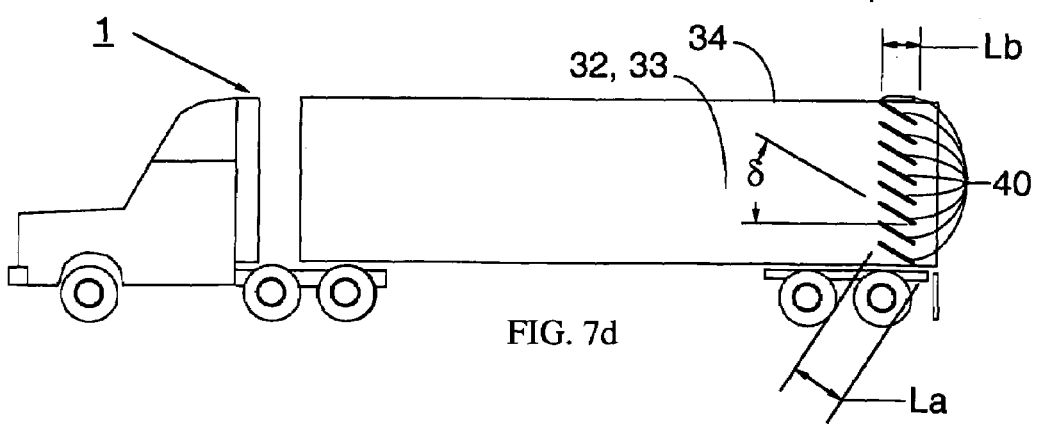

FIG. 7a to 7d are side views of various embodiments of the subject invention 40 installed on a tractor-trailer truck 1. FIG. 7a is a side view of a tractor-trailer truck 1 with the subject invention 40, comprised of a minimal number of outward projected adjacent surfaces orientated with a large incidence angle δ, installed in the furthest aft position on the trailer 30 exterior side surfaces 32 and 33 and exterior top surface 34. FIG. 7b is a side view of a tractor-trailer truck 1 with the subject invention 40, comprised of a minimal number of outward projected adjacent surfaces orientated with a large incidence angle δ, installed in a forward position on the trailer 30 exterior side surfaces 32 and 33 and exterior top surface 34. FIG. 7c is a side view of a tractor-trailer truck 1 with the subject invention 40, comprised of a increased number of outward projected adjacent surfaces orientated with a reduced incidence angle δ, installed in an aft position on the trailer 30 exterior side surfaces 32 and 33 and exterior top surface 34. FIG. 7d is a side view of a tractor-trailer truck 1 with the subject invention 40, comprised of a increased number of outward projected adjacent surfaces with a reduced length La and Lb and a large incidence angle δ, installed in the aft position on the trailer 30 exterior side surfaces 32 and 33 and exterior top surface 34.

Figure 8A:
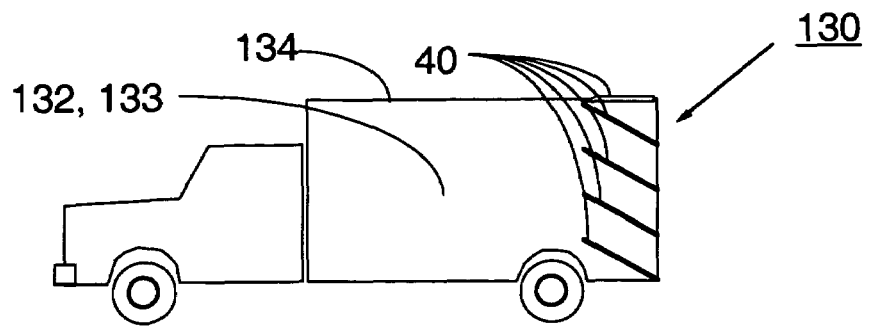
FIG. 8a to 8d are side views of alternate embodiments of the subject invention installed on various ground vehicles.
Figure 8B:
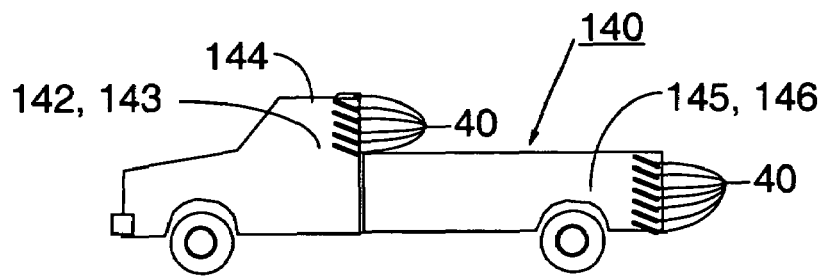
Figure 8C:
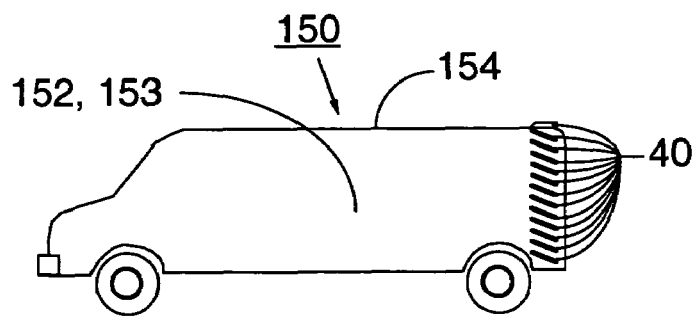
Figure 8D:
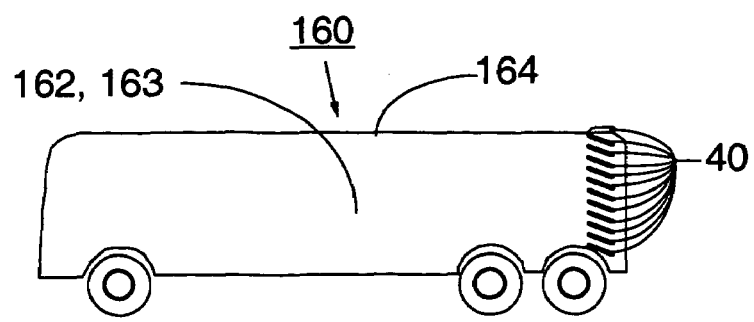

FIG. 8a to 8d are side views of various embodiments of the subject invention 40 installed on various ground vehicles. FIG. 8a is a side view of a surface truck 130 with the subject invention 40, comprised of a minimal number of outward projected adjacent surfaces orientated with a large incidence angle δ, installed in the furthest aft position on the truck 130 exterior side surfaces 132 and 133 and exterior top surface 134. FIG. 8b is a side view of a pick-up truck 1 with the subject invention 40, comprised of a large number of outward projected adjacent surfaces orientated with a small incidence angle δ, installed on the pick-up cab exterior side surfaces 142 and 143 and exterior top surface 144 and the pick-up bed exterior side surfaces 145 and 146. FIG. 8c is a side view of a van 150 with the subject invention 40, comprised of a increased number of outward projected adjacent surfaces orientated with a reduced incidence angle δ, installed in an aft position on the van 150 exterior side surfaces 152 and 153 and exterior top surface 154. FIG. 8d is a side view of a bus 160 with the subject invention 40, comprised of a increased number of outward projected adjacent surfaces with a reduced length and a large incidence angle δ, installed in the aft position on the bus 160 exterior side surfaces 162 and 163 and exterior top surface 164.

Figure 9:
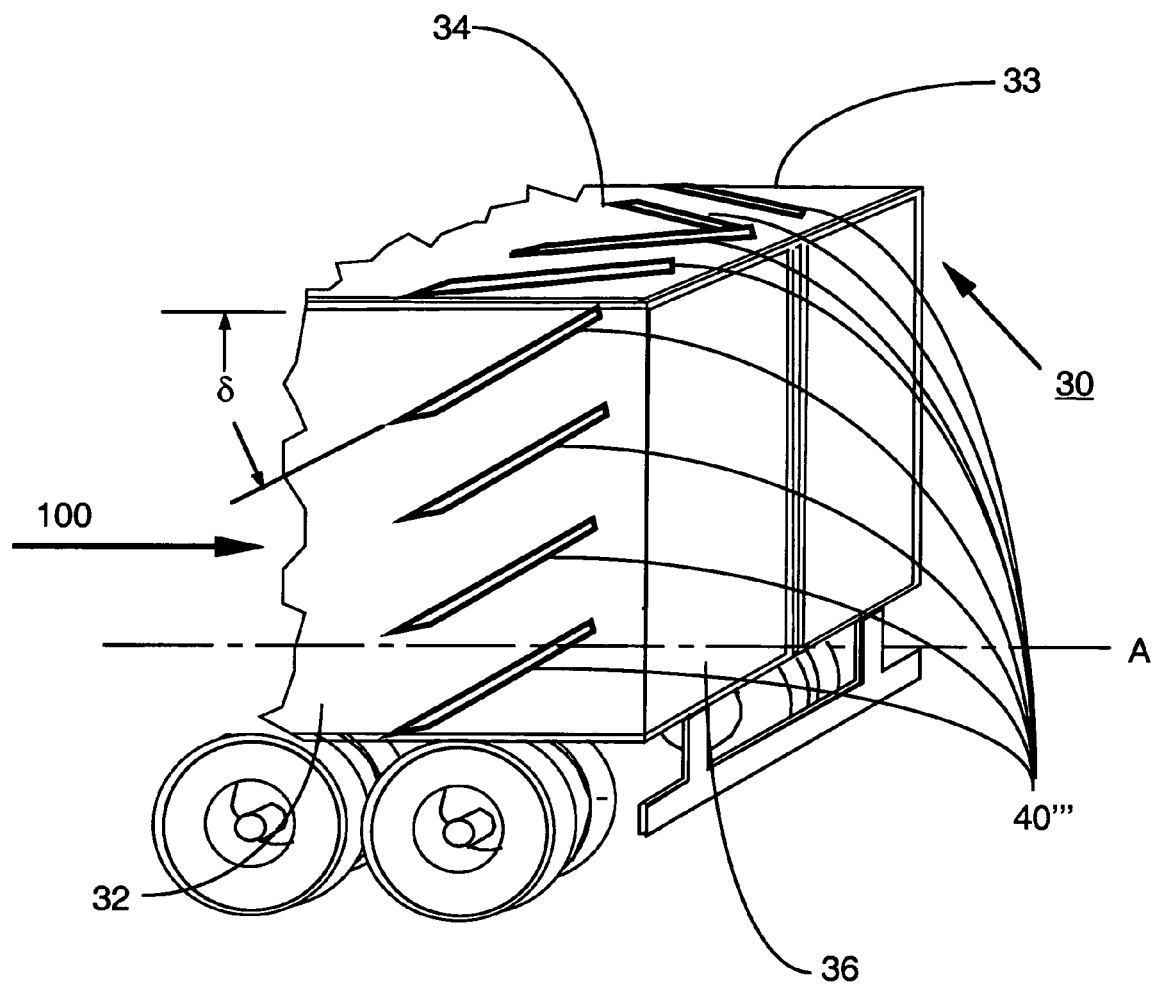
FIG. 9 is a side rear perspective view of the aft portion of a trailer showing an alternate embodiment of the subject invention.

FIG. 9 is a rear perspective view of the aft portion of a typical trailer 30 of a tractor-trailer truck showing an alternate embodiment of the subject invention 40'" installed on the exterior side surfaces 32 and 33 and exterior top surface 34 of a trailer 30. The number, shape, size, and orientation of the plurality of outward extended adjacent surfaces comprising the subject invention 40'" are a function of the geometry of the trailer exterior side surfaces 32 and 33, geometry of the trailer exterior top surface 34 and the geometry of the trailer exterior base surface 36. The subject invention 40'" is comprised of a plurality of outward extended surfaces that are evenly distributed circumferentially about the aft portion of the vehicle. Each surface is inclined at an angle δ to the direction of the flow 100 passing along the exterior side surfaces 32 and 33 and the exterior top surface 34 of the trailer 30. The leading edge of each outward projected surface, comprising the invention 40'", located on the exterior side surfaces 32 and 33 of the trailer 30 are orientated with the leading edge of each surface at a vertical position that is below the trailing edge of each surface. The leading edge of each outward projected surface, comprising the invention 40'", located on the exterior top surface 34 of the trailer 30 are orientated with the leading edge of each surface positioned outboard of the trailing edge of each surface.

ADVANTAGES

From the description provided above, a number of advantages of the vortex strakes become evident:

The invention provides a novel process to reduce the drag of a bluff-base body.

(a) The invention provides a means to use vortices generated on the top and side surfaces of a bluff-base body to reduce drag.

(b) The invention provides a means to reduce the aerodynamic drag and improve the operational efficiency of bluff-base vehicles.

(c) The invention provides a means to reduce the aerodynamic drag and improve the fuel efficiency of bluff-base vehicles.

(d) The invention provides a means to conserve energy and improve the operational efficiency of bluff-base vehicles.

(e) The invention provides a means to reduce the aerodynamic drag without a significant geometric modification to existing bluff-base vehicles.

(f) The invention may be easily applied to any existing bluff-base vehicle or designed into any new bluff-base vehicle.

(g) The invention allows for the efficient operation of the invention with a limited number of outward extended surfaces.

(h) The invention allows for the matching of complex surface shapes by the shaping and placement of the plurality of outward extended surfaces.

(i) Large reductions in drag force can be achieved by the plurality of vortices.

(j) The structure of each outward extended surface may be adapted to meet specific performance or vehicle integration requirements.

(k) The shape of each single outward extended surface may be planar, cylindrical, or combinations thereof to meet specific performance or vehicle integration requirements.

(l) The ability to optimally position each outward extended surface on the vehicle top surface and side surfaces.
(m) The ability to minimize weight and volume requirements within the vehicle.
(n) The ability to minimize maintenance requirements.
(o) The ability to maximize the safety of vehicle operation.

CONCLUSION, RAMIFICATIONS, AND SCOPE

Accordingly, the reader will see that the vortex strake device can be used to easily and conveniently reduce aerodynamic drag on any ground vehicle for the purposes of improving the operational performance of the vehicle. Furthermore, the plurality of outward extended adjacent surfaces comprising the vortex strake device has the additional advantages in that:
  it provides a aerodynamic drag reduction force over the base of the vehicle;
  it allows the contour of the host surface to be easily matched;
  it allows easy application to any existing vehicle or designed into any existing vehicle;
  it allows the device to be fabricated as an independent unit that may be applied to an existing surface;
  it allows for optimal positioning of each outward extended surface on the vehicle side surfaces and top surface;
  it allows the design of a system with minimum weight and to require minimum volume within the vehicle;
  it allows minimum maintenance requirements;
  it allows for the maximum safety of vehicle operation;

Although the description above contains many specificities, these should not be construed as limiting the scope of the invention but as merely providing illustrations of some of the presently preferred embodiments of this invention. For example, the outward projected surfaces can have various non-planar shapes such as ellipsoid, complex, etc.; the thickness and width can vary along the length; the material can be any light-weight and structurally sound material such as wood, plastic, metal, composites, etc.; the substrate can be any metal, wood, plastic, composite, rubber, ceramic, etc.; the application surface can be that of a metal, wood, plastic, composite, rubber, ceramic, etc.

The invention has been described relative to specific embodiments thereof and relative to specific vehicles; it is not so limited. The invention is considered applicable to any road vehicle including automobiles, trucks, buses, trains, recreational vehicles and campers. The invention is also considered applicable to non-road vehicles such as hovercraft, watercraft, aircraft and components of these vehicles. It is to be understood that various modifications and variation of the specific embodiments described herein will be readily apparent to those skilled in the art in light of the above teachings without departing from the spirit and scope.

Thus, the scope of the invention should be determined by the appended claims and their legal equivalents, rather than by the examples given.

I claim:

1. An aerodynamic drag reduction device for use on a vehicle comprising:
  a plurality of small surfaces attached to the aft exterior surface of said vehicle,
  a means for attaching said small surfaces to said vehicle,
  said plurality of small surfaces are symmetrically positioned about said vehicle's principle longitudinal axis,
  said plurality of small surfaces are approximately equally spaced around the majority of the circumference of said vehicle,
  each of said small surfaces are positioned at approximately the same longitudinal position on said vehicle,
  each of said small surfaces extends outward from the exterior surface of said vehicle a distance equal to the local boundary layer thickness on said vehicle in the region of said small surfaces,
  each of said small surfaces extends an equivalent distance perpendicularly outward from the exterior surface of said vehicle,
  each of said small surfaces that are adjacent to one another on either the right or left side of said vehicle are substantially parallel to one another,
  each of said small surfaces has a forward most edge that is pointed, each of said small surfaces are thin with a maximum thickness of 1.0 inches,
  each of said small surfaces has a minimum length that is equal to 5 times the local boundary layer thickness on said vehicle in the region of said small surfaces,
  each of said small surfaces is inclined a minimum of 10° to the local flow direction measured on said vehicle surface in the region of said small surfaces,
  each of said small surfaces being separated from and substantially parallel to one another allow each said small surfaces to generate a vortex of equivalent strength thereby the flow passing along the external surface of said vehicle in the region of and aft of said small surfaces is energized and thereby the external trailing wake flow of the vehicle is changed to a substantially steady symmetric wake flow field.

2. An aerodynamic drag reduction device of claim 1 wherein said small surfaces are rigid.

3. An aerodynamic drag reduction device of claim 1 wherein said small surfaces are flexible.

4. An aerodynamic drag reduction device of claim 1 wherein said small surfaces may be inflatable.

5. An aerodynamic drag reduction device of claim 1 wherein each said small surface is constructed as a single element and attached to said vehicle.

6. An aerodynamic drag reduction device of claim 1 wherein two or more said small surfaces are constructed as a single assembly and attached to said vehicle.

7. An aerodynamic drag reduction device as specified in claim 1 wherein said vehicle is an air vehicle.

8. An aerodynamic drag reduction device as specified in claim 1 wherein said vehicle is a ground vehicle.

9. An aerodynamic drag reduction device for a vehicle comprising:
  a plurality of small surfaces on the aft exterior surface of said vehicle,
  said plurality of said small surfaces are symmetrically positioned about said vehicle principle longitudinal axis,
  said plurality of said small surfaces are separated by an approximately equally space around the majority of the circumference of said vehicle,
  each of said small surfaces are at approximately the same longitudinal position on said vehicle,
  each of said small surfaces extends outward from the exterior surface of said vehicle a distance equal to the local boundary layer thickness on said vehicle in the region of said small surfaces,
  each of said small surfaces extends an equivalent distance perpendicularly outward from the exterior surface of said vehicle, each of said small surfaces that are adjacent to one another on either the right or left side of said vehicle are substantially parallel to one another, each of said small surfaces has a forward most edge that is pointed, each of said small surfaces are thin with a maximum thickness of 1.0 inches, each of said small surfaces has a minimum length equal to 5 times the local boundary layer thickness on said vehicle in the region of said small surfaces, each of said small surfaces is inclined a minimum of 10° to the local flow direction measured on said vehicle surface in the region of said small surfaces, each of said small surfaces being separated from and substantially parallel to one another allow each said small surface to generate a vortex of equivalent strength thereby the flow passing along the external surface of said vehicle in the region of and aft of said small surface is energized and thereby the external trailing wake flow of the vehicle is changed to a substantially steady symmetric wake flow field and drag is reduced.

10. An aerodynamic drag reduction device of claim 9 wherein said small surfaces are rigid.

11. An aerodynamic drag reduction device of claim 9 wherein said small surfaces are flexible.

12. An aerodynamic drag reduction device of claim 9 wherein said small surfaces may be inflatable.

13. An aerodynamic drag reduction device as specified in claim 9 wherein said vehicle is an air vehicle.

14. An aerodynamic drag reduction device as specified in claim 9 wherein said vehicle is a ground vehicle.

15. An aerodynamic drag reduction device for use on a vehicle comprising:
a plurality of surfaces attached to top and side exterior surfaces of the vehicle and toward the aft of the vehicle;
wherein the surfaces are substantially equally spaced apart from each other and positioned about a principle longitudinal axis of the vehicle;
wherein the surfaces each extend outward from the surface of the vehicle at a length substantially equal to the local boundary layer thickness on the vehicle in the region of the surfaces; and
wherein the surfaces are substantially parallel to each other and are positioned at an angle of at least 10° to the airflow so that the surfaces generate a vortex of sufficient strength to energize the airflow passing along the external surface of the vehicle in the region of and aft to the surfaces to such a degree that the vehicle has a substantially steady symmetric wake flow field.

16. The aerodynamic drag reduction device of claim 15, wherein the surfaces have a thickness of up to 1 inch and a length of at least 5 times the local boundary layer thickness on the vehicle in the region of the surfaces.

17. The aerodynamic drag reduction device of claim 15, wherein the leading edges of the surfaces are aerodynamically sharp.

18. The aerodynamic drag reduction device of claim 15, wherein each of the surfaces is a separate element and is attached to the vehicle separately from the other surfaces.

19. The aerodynamic drag reduction device of claim 15, further comprising a base plate, wherein two or more of the surfaces are affixed to the base plate and the base plate is attached to the vehicle.

20. The aerodynamic drag reduction device of claim 15, wherein the surfaces are integrally attached to the surface of the vehicle.

21. The aerodynamic drag reduction device of claim 15, wherein the surfaces attached to the side surfaces of the vehicle are oriented such that the leading edge of the surfaces is above the trailing edge of the surfaces.

22. The aerodynamic drag reduction device of claim 15, wherein the surfaces attached to the side surfaces of the vehicle are oriented such that the leading edge of the surfaces is below the trailing edge of the surfaces.

23. The aerodynamic drag reduction device of claim 15, wherein the surfaces attached to the top surface of the vehicle are oriented such that the leading edge of the surfaces is inboard of the trailing edge of the surfaces.

24. The aerodynamic drag reduction device of claim 15, wherein the surfaces attached to the top surface of the vehicle are oriented such that the trailing edge of the surfaces is inboard of the leading edge of the surfaces.

25. The aerodynamic drag reduction device of claim 15, wherein the trailing edge of the surface located nearest the lowest edge of the side surface of the vehicle is approximately coincident with the lowest edge of the side surface of the vehicle and the leading edge of the surface located nearest the highest edge of the side surface of the vehicle is approximately coincident with the highest edge of the side surface of the vehicle; and
wherein the trailing edge of the surface located nearest the outer edge of the top surface of the vehicle is coincident with the outer edge of the top surface of the vehicle and the centermost surfaces located on the top surface of the vehicle will have leading edges at lateral positions coincident with the vehicle centerline.

26. The aerodynamic drag reduction device of claim 15, wherein for the surfaces attached to the side surfaces of the vehicle, the vertical position of the next adjacent surface in increasing vertical position is oriented such that the trailing edge of the adjacent surface is located at a vertical position that is equal to or less than the vertical position of the leading edge of the previous surface.

27. The aerodynamic drag reduction device of claim 15, wherein for the surfaces attached to the top surface of the vehicle, the position of the next adjacent surface on the top of the vehicle is such that the trailing edge is located at a lateral position that is equal to or greater than the lateral position of the leading edge of the previous surface.

28. The aerodynamic drag reduction device of claim 15, wherein the surfaces are oriented at an angle of up to 30° to the airflow.

* * * * *